(12) United States Patent
Pfeffer et al.

(10) Patent No.: US 7,658,340 B2
(45) Date of Patent: Feb. 9, 2010

(54) SYSTEM AND METHOD FOR NANOPARTICLE AND NANOAGGLOMERATE FLUIDIZATION

(75) Inventors: Robert Pfeffer, Fort Lee, NJ (US); Caroline H. Nam, Budd Lake, NJ (US); Rajesh N. Dave, Short Hills, NJ (US); Guangliang Liu, Wilmington, DE (US); Jose A. Quevedo, Brick, NJ (US); Qun Yu, South Bound Brook, NJ (US); Chao Zhu, Edison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 556 days.

(21) Appl. No.: 11/605,176

(22) Filed: Nov. 28, 2006

(65) Prior Publication Data

US 2007/0108320 A1    May 17, 2007

Related U.S. Application Data

(62) Division of application No. 10/900,868, filed on Jul. 27, 2004, now abandoned.

(60) Provisional application No. 60/490,912, filed on Jul. 29, 2003, provisional application No. 60/568,131, filed on May 4, 2004.

(51) Int. Cl.
*B02C 19/00* (2006.01)
*B02C 19/06* (2006.01)

(52) U.S. Cl. .............................................. 241/1; 241/5

(58) Field of Classification Search ................ 241/1, 241/5
See application file for complete search history.

(56) References Cited

U.S. PATENT DOCUMENTS

| | | | |
|---|---|---|---|
| 3,848,363 | A | 11/1974 | Lovness et al. |
| 4,720,025 | A | 1/1988 | Tatevosian et al. |
| 6,471,096 | B1 | 10/2002 | Dave |

OTHER PUBLICATIONS

W.Y. Wu, K.L. Smith, S.C. Saxena, Rheology of a magnetically stabilized bed consisting of mixtures of magnetic and non-magnetic particles, Powder Technology, 91(1997) 181-187.

X. Lu, H. Li, Fluidization of $CaCo_3$ and $Fe_2O_3$ particle mixtures in a transverse rotating magnetic field, Powder Technology, 107(2000) 66-78.

(Continued)

*Primary Examiner*—Bena Miller
(74) *Attorney, Agent, or Firm*—McCarter & English, LLP

(57) ABSTRACT

With the coupling of an external field and aeration (or a flow of another gas), nanoparticles can be smoothly and vigorously fluidized. A magnetic force and/or pre-treatment may be employed with the fluidizing gas and, when coupled with a fluidizing medium, provide excellent means for achieving homogenous nanofluidization. The magnetic force interacts with non-fluidizing magnetic particles and helps to break channels as well as provide enough energy to disrupt the strong interparticle forces, thereby establishing an advantageous agglomerate size distribution. Enhanced fluidization is reflected by improved performance-related attributes. The fluidized nanoparticles may be coated, surface-treated and/or surface-modified in the fluidized state. In addition, the fluidized nanoparticles may participate in a reaction, either as a reactant or a catalyst, while in the fluidized state.

11 Claims, 24 Drawing Sheets

OTHER PUBLICATIONS

Morse, *Sonic energy in granular solid fluidization*, Ind. Eng. Chem., 47 (6) (1995) 1170-1175.

Russo et al., The influence of the frequency of acoustic waves on sound-assisted fluidization of beds of fine particles, Powder Technology, 82 (1995) 219-230.

Levy et al., Effect of an acoustic field on bubbling in a gas fluidized bed, Powder Technology, 90 (1997) 53-57.

Chirone et al., Bubbling fluidization of a cohesive powder in an acoustic field, Fluidization VII, 1992, 545-553.

Wang et al., Fluidization and agglomerate structure of $SiO_2$ nanoparticles, Powder Technology, 124 (2002) 152-159.8.

Matsuda et al., Particle and bubble behavior in ultrafine particle fluidization with high G, Fluidization X, Eng. Found, 2001, 501-508.

Matsuda et al., Modeling for size reduction of agglomerates in nanoparticle fluidization, AIChE 2002 Annual Meeting, Nov. 3-8, 2002, Indianapolis, IN, 138e.

M.V. Filippov, The effect of a magnetic field on a ferromagnetic particle suspension bed, Prik. Magnit. Lat. SSR, 12 (1960) 215.

R. E. Rosensweig, Process concepts using field stabilized two-phase flow, J. of Electrostatics, 34 (1995)163-187.

V.L. Ganzha, S.C. Saxena, Heat-transfer characteristics of magnetofluidized beds of pure and admixtures of magnetic and non-magnetic particles, Int. Journal of Heat Mass Transfer, 41(1998) 209-218.

J. Arnaldos, J. Casal, A. Lucas, L. Puigjamer, Magnetically stabilized fluidization: modeling and application to mixtures, Powder Technology, 44(1985) 57-6224.

W.Y. Wu, A. Navada, S.C. Saxena, Hydrodynamic characteristics of a magnetically stabilized air fluidized bed of an admixture of magnetic and non-magnetic particles, Powder Technology, 90(1997) 39-46.

TYPICAL NANOPARTICLE AGGLOMERATE SIZE DISTRIBUTION BY
WEIGHT (DEGUSSA AEROSIL® R972)

Bed height as a function of time. (♦) The bed was initially subjected to vibration (Γ = 2, f = 50 Hz) and aeration at an air superficial velocity of 0.91 cm/s., and at t = 0, the vibration was discontinued; (▲)The bed was initially subjected to vibration (Γ = 2, f = 50 Hz) and aeration at an air velocity of 0.45 cm/s., and at t = 0, both vibration and aeration were stopped.

| Frequency of Magnetic field (Hz) | Umf (cm/s) | Bed expansion ratios at Ugas = 2.29 cm/s |
|---|---|---|
| 45 | 0.65 | 5.26 |
| 60 | 0.51 | 5.30 |
| 80 | 2.64 | 2.17 (Ugas=2.64 cm/s) |

| Experimental Conditions | Soft agglomerates Umf (cm/s) | Hard agglomerates Umf (cm/s) | 80/20 Mixture Umf (cm/s) |
|---|---|---|---|
| Before processing, conventional fluidization | 0.23 | >13.2 | 5.67 |
| During magnetic processing, magnetic assisted fluidization | 0.26 | 0.38 | 0.14 |
| After magnetic processing (magnets removed from the processed nano-powder), conventional fluidization | 0.23 | 2.29 | 1.25 |
FIG. 12
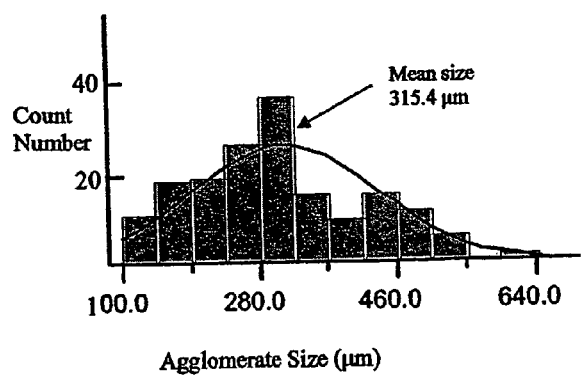
FIG. 13 (a)
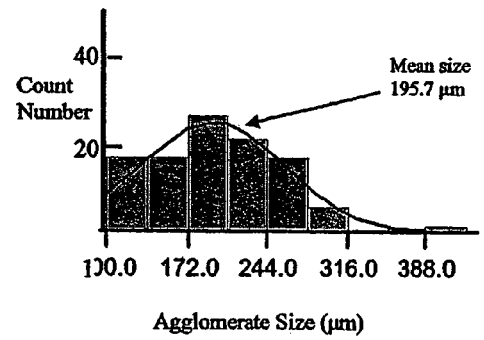
FIG. 13 (b)

| Mass ratio (magnets to nanoparticles) | Umf (cm/s) | Bed expansion ratios at Ugas = 1.26 cm/s | Bed expansion ratios at Ugas = 1.96 cm/s |
|---|---|---|---|
| 1:4 | 1.61 | 1.35 | 3.82 |
| 1:2 | 0.51 | 3.57 | 4.43 |
| 1:1 | 0.26 | 3.35 | 4.09 |
| 2:1 | 0.26 | 3.91 | 4.91 |

FIG. 15

| Intensity of Magnetic field (Gauss) | Umf (cm/s) | Bed expansion ratios at Ugas = 2.29 cm/s |
|---|---|---|
| 100 | 2.29 | 5.13 |
| 120 | 0.51 | 5.30 |
| 140 | 0.26 | 5.52 |

FIG. 16

 
FIG. 19 (a) FIG. 19 (b)
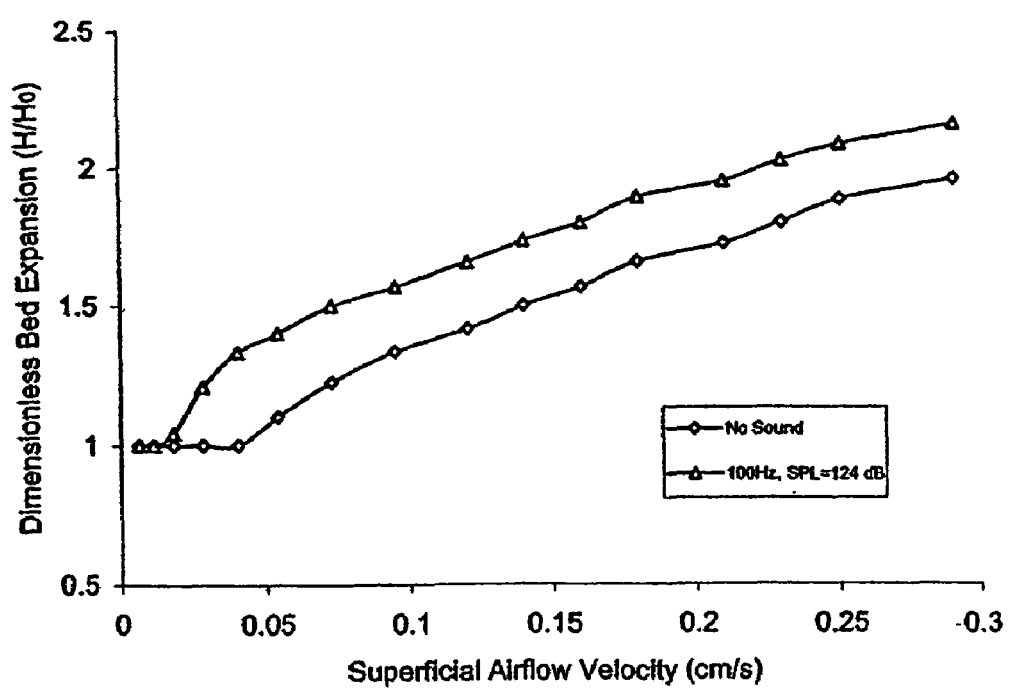
FIG. 20

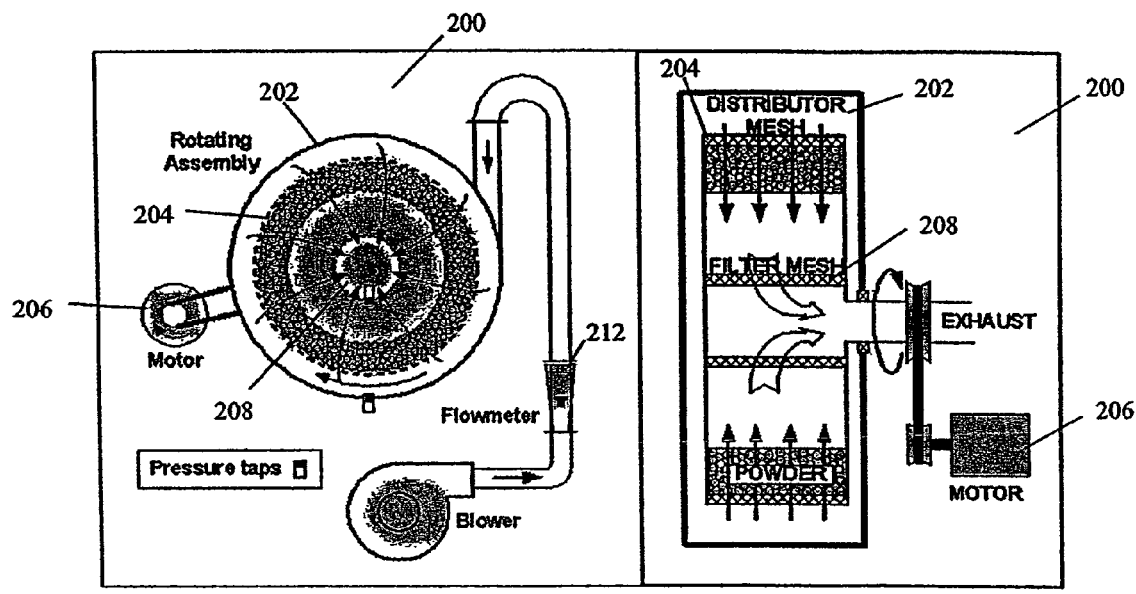
FIG. 25 (a)  FIG. 25 (b)
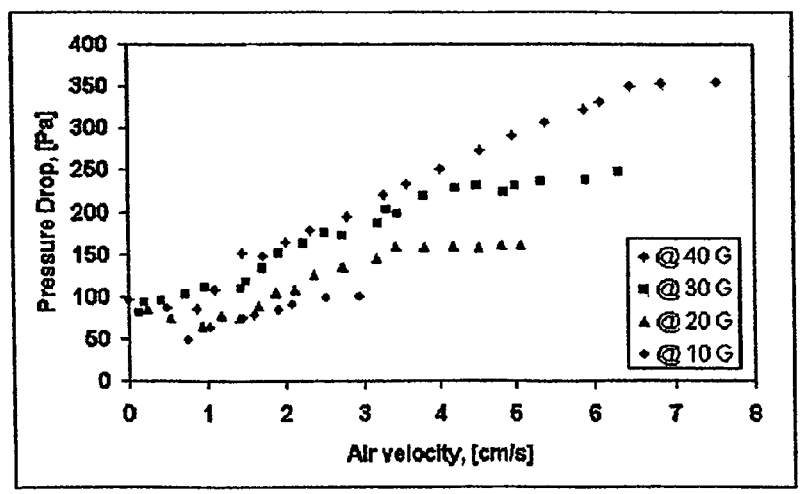
FIG. 26

| Powder | Wettability | BET m²/g | Size nm | Bulk Density kg/m³ | Material | Material Density kg/m³ | Fluid-ization Type | Surface modifi-cation | Meas-ured Umf (cm/s) |
|---|---|---|---|---|---|---|---|---|---|
| R974 | Hydrophobic | 170 | 12 | 33.24 | SiO₂ | 2560 | APF | DDS | 0.23 |
| R805 | Hydrophobic | 150 | 12 | 45.88 | SiO₂ | 2560 | APF | DDS | 0.65 |
| R104 | Hydrophobic | 150 | 12 | 62.90 | SiO₂ | 2560 | APF | OCS | 0.43 |
| R711 | Hydrophobic | 150 | 12 | 45.88 | SiO₂ | 2560 | APF | MCS | 0.38 |
| COK 84 | Hydrophilic | 170 | 12 | 37.86 | SiO₂-Al₂O₃ :7-1 | 2740 | APF | None | 1.26 |
| R106 | Hydrophobic | 250 | 7 | 41.49 | SiO₂ | 2560 | APF | OCS | 0.23 |
| A 300 | Hydrophilic | 300 | 7 | 39.00 | SiO₂ | 2560 | APF | None | 1.10 |
| R972 | Hydrophobic | 110 | 16 | 39.00 | SiO₂ | 2560 | APF | DDS | 0.29 |
| OX50 | Hydrophilic | 50 | 40 | 121.33 | SiO₂ | 2560 | ABF | None | 4.03 |
| A 90 | Hydrophilic | 90 | 20 | 52.00 | SiO₂ | 2560 | ABF | None | 7.71 |
| TiO₂ | Hydrophilic | 50 | 21 | 128.29 | TiO₂ | 4500 | ABF | None | 5.17 |

FIG. 33

| Powder | Measured $U_{mf}$ (cm/s) | Calculated $U_{mf}$ (Eqn.11) (cm/s) | Measured $\frac{H_{mf}}{H_0}$ | $Re_{mf}$ ($\frac{\rho_a d_a V}{\mu}$) | $Fr_{mf}$ ($\frac{u_{mf}^2}{d_a g}$) | $\frac{\rho_a - \rho_g}{\rho_g}$ | $\frac{H_{mf}}{d_t}$ | $\Pi$ |
|---|---|---|---|---|---|---|---|---|
| R974 | 0.23 | 0.17 | 1.73 | 0.05 | 0.0013 | 31.7 | 3.71 | 0.008 |
| R805 | 0.65 | 0.56 | 1.53 | 0.19 | 0.0109 | 51.9 | 2.27 | 0.246 |
| R104 | 0.43 | 0.42 | 1.57 | 0.13 | 0.0068 | 65.0 | 3.41 | 0.197 |
| R711 | 0.38 | 0.31 | 1.51 | 0.08 | 0.0045 | 52.5 | 2.24 | 0.043 |
| COK84 | 1.26 | 0.94 | 1.84 | 0.35 | 0.0316 | 42.0 | 3.32 | 1.55 |
| R106 | 0.23 | 0.17 | 1.55 | 0.05 | 0.0015 | 42.6 | 2.55 | 0.008 |
| A 300 | 1.1 | 0.83 | 2.00 | 0.29 | 0.0288 | 40.8 | 3.5 | 1.19 |
| R972 | 0.29 | 0.24 | 1.48 | 0.05 | 0.0021 | 44.1 | 2.2 | 0.010 |

FIG. 34

| Powder | Measured Agglomerate size (μm) | Measured $U_{mf}$ (cm/s) | Measured $\frac{H_{mf}}{H_0}$ | $Re_{mf}$ $(\frac{\rho_a d_a V}{\mu})$ | $Fr_{mf}$ $(\frac{u_{mf}^2}{d_a g})$ | $\frac{\rho_a - \rho_g}{\rho_g}$ | $\frac{H_{mf}}{d_t}$ | Π |
|---|---|---|---|---|---|---|---|---|
| OX50 | 300* | 4.03 | 1.44 | 1.81 | 0.552 | 131. | 3.02 | 398 |
| A 90 | 896 | 7.71 | 1.11 | 16.5 | 0.677 | 55.8 | 2.31 | 1441 |
| TiO$_2$ | 195 | 5.17 | 1.3 | 1.74 | 1.4 | 139. | 2.73 | 927 |

* Estimated, could not be measured.

US 7,658,340 B2

SYSTEM AND METHOD FOR NANOPARTICLE AND NANOAGGLOMERATE FLUIDIZATION

CROSS-REFERENCE TO RELATED APPLICATION

This application is a divisional of U.S. application Ser. No. 10/900,868 filed Jul. 27, 2004, now abandoned which is claimed under 35 U.S.C. 119(e) and 120.

The present application claims the benefit of the following co-pending, commonly assigned provisional patent applications: (i) "Vibrofluidization and Magnetically Assisted Fluidization of Nanoparticles," filed on Jul. 29, 2003 and assigned Ser. No. 60/490,912, and (ii) "Nanoparticle and Nanoagglomerate Fluidization System and Method," filed on May 4, 2004 and assigned Ser. No. 60/568,131. The contents of each of the foregoing provisional patent applications are incorporated herein by reference.

The U.S. Government has a paid-up license in this invention and the right in limited circumstances to require the patent owner to license others on reasonable terms as provided for by the terms of Grant No. NSF-DMI-0210400 awarded by the National Science Foundation.

BACKGROUND OF THE DISCLOSURE

1. Technical Field

The present disclosure relates to system(s) and method(s)/process(es) for fluidizing nanoparticles and nanoagglomerates. More particularly, the present disclosure is directed to systems and methods/processes for fluidizing nanoparticles and nanoagglomerates utilizing a fluidizing gas with one or more external forces, e.g., a vibration force, a magnetic force, an acoustic force, a rotational force and combinations thereof. Advantageous results are achieved, at least in part, by establishing a desired nanoparticle/nanoagglomerate particle size distribution within the system and substantially maintaining such distribution as the system achieves and maintains a fluidized state.

2. Background of Related Art

Fluidization is a widely used process in several industries to achieve continuous powder handling ability, particle mixing, and desirable levels of solid-gas contact. By definition, gas fluidization is a process in which solid particles are transformed into a fluid-like state through suspension in a gas. Gas fluidization is one of the best techniques available to disperse and process powders belonging to the Geldart group A and B classifications. Fluidization processes can be used to achieve high heat and mass transfer and reaction rates. Gas fluidization of small solid particles has been widely used in a variety of industrial applications because of its unusual capability of continuous powder handling, good mixing, large gas-solid contact area and high rates of heat and mass transfer.

Extensive research has been done in the area of gas fluidization, and the fluidization behavior of classical powders in the size range of 30 to 1000 μm (Geldart group A and B powders) is relatively well understood. However, the fluidization behavior of ultrafine particles, including nanoparticles which are in the extreme low end of Group C particles (<20 microns) in Geldart's Classification of Powders, is much more complex and has received relatively little attention in the literature. Nanoparticles are difficult to fluidize due to their strong interparticle forces. A bed of nanosized silica, for example, will exhibit plug formation, channeling, and/or spouting in a conventional fluidized bed. As far as is known, fluidization of nanoparticles (which are three orders of magnitude smaller than traditional group C powders) has heretofore been extremely difficult, if not impossible, to effectively achieve.

At least in part based on their very small primary particle size and very large surface area per unit mass, nanostructured materials are effective for the manufacture of drugs, cosmetics, foods, plastics, catalysts, high-strength or corrosion resistant materials, energetic and bio materials, and in mechatronics and micro-electro-mechanical systems (MEMS). Based on such uses, processing technologies which can handle large quantities of nanosized particles, e.g., mixing, transporting, modifying the surface properties (coating) and downstream processing of nanoparticles to form nano-composites, are desirable. But before processing of nanostructured materials can take place, the nanosized particles have to be well dispersed.

Strong interparticle forces exist between nanoparticles, such as van der Waals, electrostatic and moisture-induced surface tension forces. Based on such forces, nanoparticles are found to be in the form of large-sized agglomerates (rather than as individual nano-sized particles) when packed together in a gaseous medium. Hence, gas fluidization of nanoparticles generally refers to the fluidization of nanoparticle agglomerates.

It is generally possible to fluidize nanoparticles as relatively large agglomerates when the gas velocity exceeds the expected minimum fluidization velocity of the agglomerates. However, there tends to be significant powder loss and non-uniform fluidization behavior. In addition, large agglomerates can form near the distributor. Thus, there remains a need for a fluidization process that minimizes or avoids powder loss and accomplishes a smoother, more controlled fluidization with good mixing.

Previous studies of gas fluidization of nanoparticle agglomerates have found that the minimum fluidization velocity is relatively high (about several orders of magnitude higher than the minimum fluidization velocity of primary nanoparticles). The size of the fluidized nanoparticle agglomerates is typically from about 100 to 700 μm, while the primary particle size ranges from 7 to 500 nm. A typical nanoparticle agglomerate size distribution (by weight percentage) for a commercially available product (Aerosil® R972 silica; Degussa; Dusseldorf, Germany) is shown in FIG. 1. The data reflected in FIG. 1 was generated by: (i) randomly sampling a storage bag of commercially available R972 silica (20.0 g), (ii) sieving the sample using ten (10) different sieve sizes and measuring the weight retained on each such sieve, (iii) recording sieve size and particle weight, and (iv) calculating weight percentage for each sieve and plotting results. As shown on FIG. 1, a typical agglomerate size distribution for a commercially available nanoparticles products is widely dispersed and includes a significant weight percentage at larger agglomerate sizes.

For some nanoparticles, very smooth fluidization occurs with extremely high bed expansion, practically no bubbles are observed, and the velocity as a function of voidage around the fluidized agglomerates obeys a modified Richardson-Zaki equation. This type of fluidization of nanoparticle agglomerates has been termed agglomerate particulate fluidization (APF) by Wang et al [See, Wang et al., *Fluidization and agglomerate structure of SiO$_2$ nanoparticles,* Powder Technology, 124 (2002) 152-159.8]. For other nanoparticles, fluidization results in a very limited bed expansion, and large bubbles rise up very quickly through the bed. This type of fluidization has been termed agglomerate bubbling fluidization (ABF) by Wang et al. However, even for the homogeneously fluidized nanoparticles, relatively large powder elutriation occurs at the high gas velocities required to fluidize the nanoagglomerates. This loss of particles may hinder the applicability of fluidization of nanoparticle agglomerates in industrial processes.

In addition to conventional gravity-driven fluidization, nanoparticle agglomerates can also be fluidized in a rotating or centrifugal fluidized bed [See, Matsuda et al., *Particle and bubble behavior in ultrafine particle fluidization with high G*, Fluidization X, Eng. Found, 2001, 501-508; Matsuda et al., *Modeling for size reduction of agglomerates in nanoparticle fluidization*, AIChE 2002 Annual Meeting, Nov. 3-8, 2002, Indianapolis, Ind., 138e], where the centrifugal force acting on the agglomerates can be set much higher than gravity.

A number of studies dealing with modeling and numerical simulation of the fluidization of nanoparticle agglomerates can be found in the literature. These models are based either on force or energy balances around individual agglomerates, the use of the Richardson-Zaki equation, or a combination of the Richardson-Zaki equation with fractal analysis for APF fluidization, or a modified kinetic theory. Recently, some applications of nanoparticle agglomerate fluidization were investigated, including the production of carbon nanotubes, and its application to photocatalytic $NO_x$ treatment. However, very little experimental data on the fluidization characteristics and differences between APF and ABF nanoparticles, such as minimum fluidization velocity, agglomerate size, hysteresis effects, and the effect of nanoparticle material properties, are available.

Sound waves, in combination with vibration, have been used to increase fluidization quality in cohesive powders whose sizes range from submicron to 20 microns. Also, vibration combined with gas flow has been used to successfully fluidize particles of smaller size, such as nanoparticles. However, notwithstanding the benefits associated with these known fluidizing techniques, often a dense immobile phase forms at a bottom of a fluidizing bed.

U.S. Pat. No. 4,720,025 to Tatevosian discloses a technique that utilizes an alternating magnetic field along with magnetic particles to loosen up material at the bottom of a hopper for feeding into a certain operation. However, the disclosed technique does not include loosening up cohesive materials for application in a fluidized bed. Similarly, U.S. Pat. No. 6,471,096 to Dave discloses the use of alternating magnetic field along with permanent magnets to produce controllable discharge of cohesive powders from a container, but does not provide for fluidization of nano-powders. U.S. Pat. No. 3,848,363 to Lovness et al. discloses the use of magnetic force to move particles in a predetermined area, but again does not provide for any application to fluidization.

The idea of using a magneto fluidized bed was proposed in 1960 by Fillipov [see, M. V. Filippov, *The effect of a magnetic field on a ferromagnetic particle suspension bed*, Prik. Magnit. Lat. SSR, 12 (1960) 215] and became popular as a means of suppressing bubbles in gas fluidized beds for a variety of industrial applications [see, R. E. Rosensweig, *Process concepts using field stabilized two-phase flow*, J. of Electrostatics, 34 (1995)163-187]. Generally, the particles to be fluidized were either magnetic particles or a mixture of magnetic and non-magnetic particles, and the magnetic field was usually generated by DC current [see; V. L. Ganzha, S. C. Saxena, *Heat-transfer characteristics of magneto fluidized beds of pure and admixtures of magnetic and nonmagnetic particles*, Int. Journal of Heat Mass Transfer, 41(1998) 209-218; J. Arnaldos, J. Casal, A. Lucas, L. Puigjamer, *Magnetically stabilized fluidization: modeling and application to mixtures*, Powder Technology, 44(1985) 57-6224; W. Y. Wu, A. Navada, S. C. Saxena, *Hydrodynamic characteristics of a magnetically stabilized air fluidized bed of an admixture of magnetic and non-magnetic particles*, Powder Technology, 90(1997) 39-46; W. Y. Wu, K. L. Smith, S. C. Saxena, *Rheology of a magnetically stabilized bed consisting of mixtures of magnetic and non-magnetic particles*, Powder Technology, 91(1997) 181-187; X. Lu, H. Li, *Fluidization of $CaCo_3$ and $Fe_2O_3$ particle mixtures in a transverse rotating magnetic field*, Powder Technology, 107(2000) 66-78], causing magnetic particles to form chains along the field. For example, Arnaldos et al [see, J. Arnaldos, J. Casal, A. Lucas, L. Puigjamer, *Magnetically stabilized fluidization: modeling and application to mixtures*, Powder Technology, 44(1985) 57-6224] studied the fluidization behavior of a mixture of magnetic and non-magnetic particles of several hundred microns in size, such as sintered nickel-silica, steel-copper and steel-silica particles. The fluidization of larger particle mixtures of millimeter size (Geldart group D particles), such as iron-copper shot of 0.935 to 1.416 mm in diameter is described in [W. Y. Wu, A. Navada, S. C. Saxena, *Hydrodynamic characteristics of a magnetically stabilized air fluidized bed of an admixture of magnetic and non-magnetic particles*, Powder Technology, 90(1997) 39-46] and [W. Y. Wu, K. L. Smith, S. C. Saxena, *Rheology of a magnetically stabilized bed consisting of mixtures of magnetic and non-magnetic particles*, Powder Technology, 91(1997) 181-187], and Lu et al [X. Lu, H. Li, *Fluidization of $CaCo_3$ and $Fe_2O_3$ particle mixtures in a transverse rotating magnetic field*, Powder Technology, 107(2000) 66-78] studied the fluidization of very fine (Geldart group C) particle mixtures of $CaCO_3$—$Fe_2O_3$ in a transverse rotating magnetic field. However, in all of these studies, the magnetic particles were fluidized along with the non-magnetic particles.

Further, from studies at New Jersey Institute of Technology (NJIT), it has been shown that a magnetically assisted impaction coating (MAIC) process may be an effective method for providing the extra force needed to break up the dense phase or layer of particles. The MAIC process has been successfully used as a dry coating method. The MAIC process utilizes an oscillating magnetic field to accelerate magnetic particles thereby providing collisions between particles and the walls of the apparatus. Each of the foregoing techniques are directed to the use of a magnetic field with magnets for accomplishing certain processes, but none of the techniques are directed to fluidization of extreme Geldart C particles, in particular, nano-powders.

At a low sound frequency, typically from 50 to 400 Hz, and a high sound pressure level, typically above 110 dB, sound waves have been shown to improve the fluidization of fine particles, which otherwise showed intense channeling or slugging rather than fluidization [Morse, *Sonic energy in granular solid fluidization*, Ind. Eng. Chem., 47 (6) (1955) 1170-1175]. Standing waves are generated in the experimental column and at a fixed sound pressure level, sound assisted fluidization can only occur within a certain range of low sound frequencies. Channeling has been found above and below this frequency range [Russo et al., *The influence of the frequency of acoustic waves on sound-assisted fluidization of beds of fine particles*, Powder Technology, 82 (1995) 219-230]. At the natural frequency of the bed of micron sized particles, high intensity sound waves have been found to lead to reductions in both the minimum bubbling velocity and the minimum fluidization velocities [Levy et al., *Effect of an acoustic field on bubbling in a gas fluidized bed*, Powder Technology, 90 (1997) 53-57]. The literature also shows that an increase in sound pressure level may also yield a decrease in bed expansion, an increase in bubble frequency and an increase in bubble size, and that high intensity sound can also effectively reduce the elutriation of fine particles [Chirone et al., *Bubbling fluidization of a cohesive powder in an acoustic field*, Fluidization VII, 1992, 545-553]. To date, the reported research has been directed to sound-assisted fluidization of micron or sub-micron sized particles. No results have been reported on the effects of sound on the fluidization of nanoparticle agglomerates.

Thus, despite efforts to date, a need remains for systems and methods/processes that provide for effective fluidization of nanoparticles. A further need remains for systems and processes that uniformly fluidize a bed of nanoparticles. Also needed are systems and processes for nanoparticle fluidization that function without forming a dense layer of agglomerates. Additionally, fluidization systems and processes that minimize powder loss while fluidizing nanoparticles are needed. It is a further need to determine characteristics of nanoparticle agglomerates and to use such characteristics in enhancing fluidization effectiveness.

SUMMARY OF THE DISCLOSURE

The present disclosure provides an improved system and method/process for fluidizing nanoparticles and nanoagglomerates that includes exposing nanoparticles and nanoagglomerates to a combined flow of fluidizing gas and at least one additional force. According to exemplary embodiments of the present disclosure, the additional force may be supplied from a variety of sources and may take a variety of forms, e.g., a vibration force, a magnetic force, an acoustic force, a rotational/centrifugal force and/or a combination thereof. The disclosed system and method utilizes a fluidizing gas (e.g., air, $N_2$, He, Ar, $O_2$ and/or combinations thereof or other fluidizing gas or gases) that may be combined with an appropriate amount of magnetic energy, mechanical energy, acoustic energy and/or rotational/centrifugal energy to enhance fluidization by disrupting interparticle forces. The nanoparticles/nanoagglomerates treated according to the disclosed system/method can form highly porous agglomerates in the size range of approximately 200-400 microns.

Enhanced fluidization of nanoagglomerate/nanoparticles systems is achieved according to the systems and methods/processes of the present disclosure, at least in part, by establishing a desired nanoparticles/nanoagglomerates particle size distribution within the system and substantially maintaining such distribution as the system achieves and maintains a fluidized state. According to exemplary embodiments of the present disclosure, a desired particle size distribution is established by introducing an external energy stimulus at a level effective to overcome the inter-particle forces associated with nanoparticles/nanoagglomerates systems and to thereby shift the particle size distribution into a range that supports and/or evidences enhanced fluidization. Alternatively, a desired particle size distribution may be effected through a pre-treatment step, e.g., a sieving step.

As used herein, "enhanced fluidization" is reflected by at least one of the following performance-related attributes: reduced levels of bubbles within the fluidized system, reduced gas bypass relative to the fluidized bed, smooth fluidization behavior, reduced elutriation, a high level of bed expansion, reduced gas velocity levels to achieve desired fluidization performance, and/or enhanced control of agglomerate size/distribution.

According to the present disclosure, modification of an initial particle size distribution (e.g., an "as received" particle size distribution) to a desired particle size distribution range allows the disclosed fluidization system to achieve and maintain desired fluidization conditions. Through introduction of an external energy source and/or a pre-treatment step, as described in greater detail herein, the disclosed fluidization system advantageously establishes a state of dynamic equilibrium, wherein nanoagglomerates are formed, broken and randomly reformed, in an expanded fluidized bed. The dynamic equilibrium established according to the disclosed system/method offers many advantages, including facilitating substantially homogenous coating and/or treatment of nanoparticles/nanoagglomerates. Exemplary fluidization apparatus according to the present disclosure includes a gas supply source and at least one energy source for generating and supplying one or more of the energies disclosed herein, e.g., a vibrating source, a source for inducing a magnetic field, an acoustic source, and/or a source of centrifugal and/or rotational force. Other features that may be associated with the fluidization apparatus of the present disclosure include a gauge for measuring gas flow, a fluidization chamber, a distributor, gas dispersion elements (e.g., glass beads), filter(s), viewing device(s) and/or a vent.

According to the present disclosure, advantageous results are achieved in fluidizing nanoparticles and nanoagglomerates across a broad range of applications, e.g., applications that involve the manufacture of drugs, cosmetics, foods, plastics, catalysts, high-strength or corrosion resistant materials, energetic and bio materials, and in mechatronics and microelectro-mechanical systems. More particularly, effective dispersion of nanoparticles and nanoagglomerates is achieved according to the present disclosure, thereby facilitating a host of nanoparticle-related processing regimens, e.g., mixing, transporting, surface property modifications (e.g., coating), and/or downstream processing to form nano-composites. In particular, by combining or coupling the flow of a fluidizing gas with one or more external forces, the combined effect is advantageously sufficient to reliably and effectively fluidize a chamber or bed of nanosized powders. That is, a bed may be expanded to more than double its original chamber or bed height with hardly any elutriation of the nanoparticles.

In addition, the system and method of the present disclosure advantageously provides for greater control of the fluidizing process, despite a high degree of mixing, thereby reducing powder loss relative to conventional fluidized chambers or beds. In one aspect of the present disclosure, for example, once the chamber or bed has been expanded, the supply of energy or force, e.g., vibration, may be terminated (or reduced) so that the chamber or bed remains expanded and fluidized for a considerable duration. Thus, the supply of energy or force in accordance with one aspect of the present disclosure may advantageously only be utilized initially to aid in the break-up of interparticle forces and form nanoagglomerates, so that the chamber or bed can be effectively fluidized. Thereafter, such energy/force may be discontinued, as desired by the system operator or applicable control systems.

Further, depending on the size distribution of the nanoagglomerates, some powder beds, under flow of fluidizing gas and external energy supply, e.g., vibration, may be divided into two distinct regimes, a dense immobile phase and a smoothly fluidized mobile phase above the dense immobile phase. The dense immobile phase may be substantially eliminated according to the present disclosure by adding heavy permanent magnetic particles to the mix, preferably near the dense immobile phase, and then exciting the magnetic particles via a magnetic field, e.g., an oscillating magnetic field. The use of an external force, e.g., magnetic, acoustic, centrifugal/rotational and/or vibration excitation forces, advantageously provides for better control of the degree of particle movement. Combining such force(s) with fluidizing gas flow advantageously achieves excellent mixing, smooth fluidization, and high bed expansion with very little particle loss in a safe and inexpensive manner.

The systems and methods of the present disclosure are advantageously well suited for fluidization of nanoparticles (extreme Geldart C powders), utilizing one or more external forces and aeration (or a flow of another gas) to overcome fluidization difficulties often associated with cohesive particles (e.g., channeling, spouting, plug formation) and to thereby advantageously achieve vigorous fluidization in any of a variety of differently shaped fluidization chambers or beds (e.g., tubular and/or rectangular fluidization beds).

According to further aspects of the present disclosure, fluidization characteristics of a variety of different nanoparticles are provided and such fluidization characteristics are advantageously correlated with macroscopic fluidization behavior (APF or ABF) of the nanoagglomerates. To establish such correlation, the properties of primary nanoparticles were established in a conventional gravity-driven fluidized bed without any additional external forces present. In addition, a simple and effective method for estimating the average size of agglomerates and bed voidage around the agglomerates is provided. The estimation methodology can then be used in models to determine the minimum fluidization velocity, pressure drop and other pertinent variables of the fluidization process, and to determine the external force(s) required to establish a desired particle size distribution to achieve and support efficacious nanoparticle/nanoagglomerate fluidization, as described herein.

These and other advantageous features and functionalities of the disclosed fluidization system and method/process for fluidizing nanoparticles will be apparent from the detailed description which follows, particularly when read in conjunction with the figures appended hereto.

BRIEF DESCRIPTION OF THE DRAWINGS

To assist those having ordinary skill in the art to which the subject matter of the present disclosure appertains in making and using the disclosed fluidization systems and methods/processes, reference is made to the appended figures, wherein:

FIG. 12 is a table showing minimum fluidization velocities for "soft" agglomerates, "hard" agglomerates, and an 80/20 mixture of hard/soft agglomerates;

FIGS. 13(a) and 13(b) are plots of particle size distribution for "soft" agglomerates with and without magnetic field application;

FIG. 15 is a table showing minimum fluidization velocities and bed expansion ratios for "soft" agglomerates with different mass ratios of magnets to nanoparticles;

FIG. 16 is a table showing minimum fluidization velocities and bed expansion ratios for "soft" agglomerates with different intensities of magnetic field;

FIGS. 19(a) and 19(b) provides images of bed behavior of $SiO_2$ nanoparticle agglomerates with and without sound excitation, respectively;

FIG. 20 provides a plot of bed expansion relative to superficial air velocity, with and without sound excitation, according to an exemplary embodiment of the present disclosure;

FIGS. 25(a) and 25(b) provide schematic diagrams of an exemplary rotating fluidized bed system according to the present disclosure;

FIG. 26 provides a plot of bed pressure drop relative to air velocity for four (4) exemplary rotation speeds (indicated in terms of equivalent gravity force, in G) according to an exemplary embodiment of the present disclosure;

FIG. 33 provides nanoparticle properties for a series of powders in tabular form;

FIG. 34 provides fluidization characteristics of APF nanoparticles in tabular form;

DETAILED DESCRIPTION OF EXEMPLARY EMBODIMENT(S)

1. Fluidization of Nanoparticles Using Vibrational and/or Magnetic Forces

According to an exemplary embodiment of the present disclosure, homogeneous fluidization of nanoparticles is advantageously achieved by coupling aeration with vibration. Vibration (e.g., at frequencies in the range of 30 to 200 Hz, and vibrational acceleration in the range of 0 to 5 g) has been found to achieve smooth fluidization of nanoparticles. Through introduction of vibrational energy, as described herein, the nanoparticle/nanoagglomerate particle size distribution is advantageously modified to and maintained in a distribution range that supports and maintains efficacious fluidization. In exemplary embodiments of the present disclosure, the minimum fluidization velocity (defined as the lowest gas velocity at which the pressure drop across the bed reaches a plateau) has been measured at approximately 0.3-0.4 cm/s, and been essentially independent of vibrational acceleration. Moreover, the bed expands almost immediately after the air is introduced, reaching bed expansions of three (3) times the initial bed height or higher. Hence, the bed appeared to exhibit a fluid-like behavior at velocities much lower than the minimum fluidization velocity. According to such exemplary embodiments, fluidization of nanoparticles is achieved due to the formation of stable, relatively large, and very porous agglomerates and bubbles/elutriation of particles were essentially non-existent.

Figure 1:
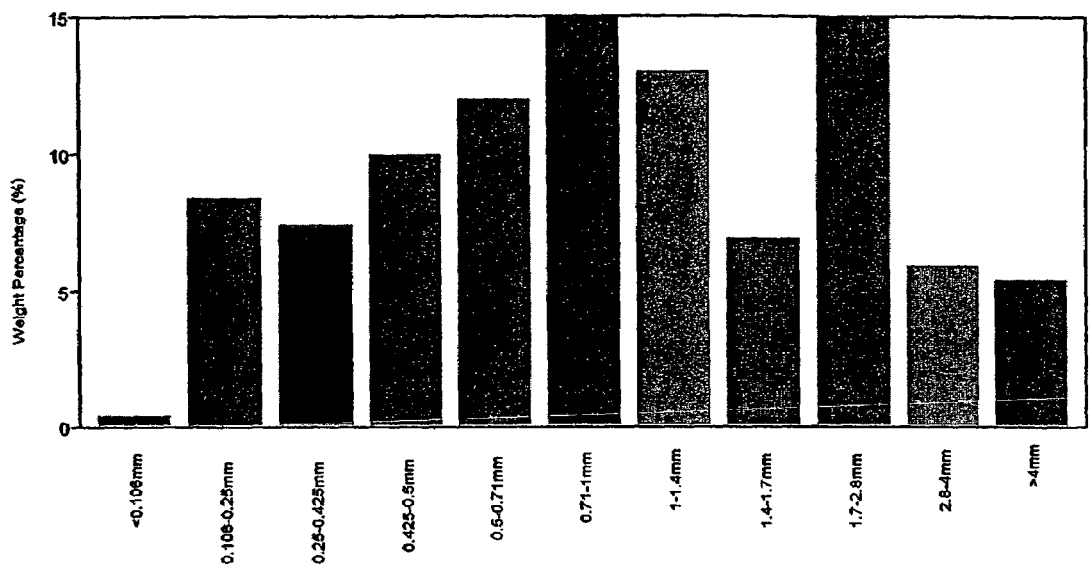
FIG. 1 is a plot of particle size distribution for a commercially available "as received" silica product.
Figure 2:
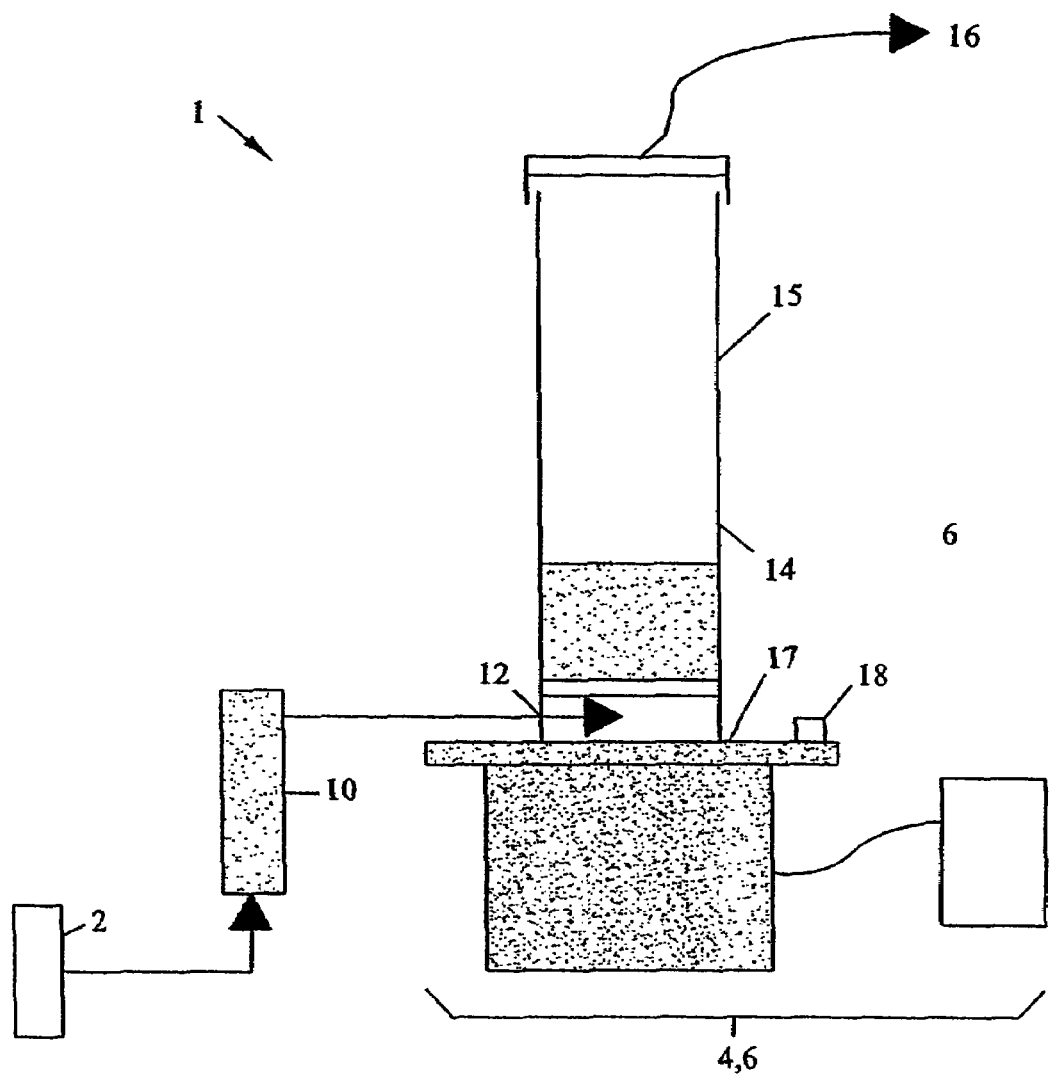
FIG. 2 is a schematic drawing of an exemplary fluidization apparatus in accordance with an illustrative aspect of the present disclosure.

Referring to the drawings and, in particular, FIG. 2, an exemplary nanoparticle fluidization apparatus in accordance with an illustrative aspect of the present invention is shown and generally represented by reference numeral 1. Apparatus 1 essentially has a gas supply source 2 suitable for supplying a fluidizing gas, a vibration source 4 suitable for providing a mechanical force, and a magnetic source 6 suitable for providing a magnetic force. Other features that may preferably be associated with the apparatus 1 include a gas inlet 8, a gauge 10 for measuring gas flow, a distributor 12, fluidization bed chamber 14, a vent 16 and/or an accelerometer 18.

In a preferred aspect of the present invention, apparatus 1 is well suited for aerated vibrofluidization. In this aspect of the invention, the fluidization bed chamber 14 may have a tube portion 15 of glass or any other suitable material, including, for example, metal, plastic, or ceramic. The tube portion 15 has an inner diameter that may preferably range from at least about one (1) centimeter to several meters. If necessary, electrostatic charge can be decreased, for example, via a DC-nozzle such as provided by Tantec, Inc. A DC-nozzle can achieve static-neutralization by ionizing the air flowing through the fluidization bed chamber 14 by taking a voltage and transforming it into a high voltage. (Input voltage: 120V AC+10-15%, 50/60 Hz, 3 ground plugs, Output Voltage: 12V DC, 300 mA). The fluidization bed chamber 14 may be mounted on top of the vibration source 4. Optionally, acceleration may be measured by the accelerometer 18 (e.g., a piezoelectric accelerometer). Examples of fluidizing gases that may be utilized in conjunction with this and other aspects of the present invention include air, nitrogen, helium, oxygen, argon and/or other gases suitable for fluidized bed chamber reaction.

In an aspect of the invention, the flow rate of the fluidizing gas, which is preferably a dry compressed air, may be measured with the gauge 10, such as, for example, by a rotameter or alternatively, any other suitable flow measuring device. Depending on the application and size of the fluidization bed chamber 14 and the powder utilized, a typical flow rate may fall anywhere in the range of about a fraction of a centimeter/second to several centimeters/second. For instance, if the fluidization bed chamber 14 having a cylindrical bed of about 3 inches is used with 12 nm silica particles (Aerosil® R972 silica), a velocity of 1 cm/sec. may preferably be employed to achieve vigorous fluidization with high bed expansion.

In another aspect of the invention, vibrational parameters (e.g., frequency, amplitude, and vibrational acceleration), which may be controlled by an inverter, for example, can be varied to achieve a desired effect on the degree of mixing and behavior of fluidization. For instance, suitable values for frequency might preferably range from about 20 to about 500 Hz; suitable values for amplitude preferably range from about 0.001 to about 13.81 mm; and suitable values for acceleration may preferably be as high as about 20 g's.

It follows from the foregoing that vibrational acceleration or intensity may be defined as a ratio of vibration acceleration to gravity acceleration: $\Gamma=(A\omega^2)/g$ where A=amplitude and $\omega=2\pi f$. Still further, as appropriate and/or needed, pressure drop may easily be measured by a manometer or a pressure transducer, for example, and recorded either manually or electronically via a computer. Operating efficacy may be monitored and/or observed, as desired, by photographing the apparatus 1 with a suitable camera, e.g., a digital camera to capture the behavior of fluidization, such as smooth or bubbling.

In illustrative embodiments of the present disclosure wherein fluidized nanoparticles were generated by aeration and vibration, a fluidized bed consisting of a glass tube with an inner diameter of 6.25 cm and height of 35 cm was employed. The fluidized bed was equipped with a series of ports for sampling and pressure measurements. The distributor consisted of a porous sintered metal material. The bed was mounted on top of a Ling Dynamic System vibrator, which can produce AC vertical sinusoidal waves with accelerations up to 5.5 g (where g is the acceleration due to gravity) measured by a piezoelectric accelerometer. The frequency (f) of vibration could be varied from 30 to 200 Hz.

The powder used was Aerosil® R974 (Degussa) hydrophobic silica having a primary particle size, particle density, bulk density, and external surface area of 12 nm, 2200 kg/m$^3$, 30 kg/m$^3$, and 200 m$^2$/g, respectively. These silica nanoparticles were at the extreme end of Geldart's group C powder classification. Humidity is an important issue when dealing with powders (especially hydrophilic powders) because of liquid bridges and electrostatic effects. However, in the experiments described herein, hydrophobic silica was employed such that humidity did not play as large a role, and bone dry compressed air was used as the fluidizing gas. The airflow rate was measured by a rotameter.

When the bed was in its typical mode of aeration (i.e., evidencing undesirable fluidization behavior, such as channeling, lifting as a plug, etc.), the vibration was turned on. Flow rate, pressure drop, vibrational acceleration, frequency and bed height measurements, as well as visual observation of the fluidization behavior for each experiment, were all recorded. The vibration intensity is defined as the ratio of vibrational acceleration to gravitational acceleration, $\Gamma=(A\omega^2)/g$, where A is the amplitude of vibration and $\omega=2\pi f$. The pressure drop was measured by a pressure transducer and recorded on a computer. Photos were taken with a digital camera.

Two methods of sampling were employed, both of which yielded similar results when the powder samples were viewed with a scanning electron microscope (SEM). The first involved aspirating out samples at different heights of the bed through small openings along the side of the tube. These samples were then gently placed on SEM sample disks. The second method consisted of gently dipping a SEM sample disk adhered with a double-side carbon tape into the fluidized bed. The sample disk was then directly used for SEM analysis. In addition, to aid in viewing agglomerates in situ, an argon laser generator (Reliant 1000M, LaserPhysics) with 3-watt power and a high-speed CCD camera with an extremely short exposure time were used. As described herein, it was observed experimentally that mechanical vibration helped break up the channeling and spouting in a bed of nano-sized powders. Considerably smaller gas velocities (but still much larger than that based on the primary nanoparticle size) were adequate in these experiments, because vibration provided sufficient energy to the system to overcome interparticle forces and form stable agglomerates.

Visual observation of a highly expanded bed revealed the presence of two distinct layers: a small bottom layer consisting of very large agglomerates and a larger top layer consisting of very smoothly fluidized smaller agglomerates. SEM micrographs indicated that the fluidized agglomerates in the top layer ranged in size from approximately 5 to 50 μm. The bottom layer consisted of agglomerates that were measured to be as large as 2 mm. When the two layers were separated by aspirating out the smoothly fluidized agglomerates, and this top portion was reused as the next bed, the bottom dense layer did not reappear. This suggests that the dense layer simply contained the hard agglomerates, which were present in the as-received nanoparticles; such hard agglomerates could have formed during handling and storage. Under vibration, these large agglomerates would sink to the bottom of the bed since the vibration energy was not sufficient to break them up and the airflow was not large enough to fluidize them. In order to avoid a large agglomerate size distribution, only the top portion of the bed (smooth layer) was used in all of our experiments described below.

A Beckman Coulter counter (dry module) was used to determine the agglomerate size distribution of the as-received silica powder. Representative Coulter counter results for pre-experiment powder indicated a mean agglomerate size of about 30-40 μm. This is highly suspect since large agglomerates of size on the order of millimeters (perhaps formed during storage) could be observed visually. These contradictory results suggest that the agglomerates are in general so fragile that any measurement method involving direct contact with the sample is not effective and reliable. It is believed that the agglomerates were broken up during the course of Coulter counter size distribution measurements, leading to agglomerate sizes of about 30-40 μm.

As mentioned above, agglomerate samples were aspirated out of the bed at different heights of the expanded fluidized bed and examined under SEM. The agglomerate sizes averaged approximately 30 μm. However, the agglomerates appeared very porous and fragile, and might have broken during their removal from the bed and/or during sample preparation for the SEM. The agglomerate size estimated from pressure drop and bed height data in fluidization experiments was considerably larger (~160 μm). Given the fragile nature of the agglomerates, it is reasonable to expect that an equilibrium between agglomerate breakage and agglomerate formation is reached during the process of fluidization. Therefore, the true agglomerate size can only be found from measuring the agglomerates dynamically as fluidization is occurring. The use of a high-speed digital camera with an extremely short exposure time and a laser beam may be effective to estimate the dynamic agglomerate size in situ.

Although the bed was not initially (before application of vibration) fluidizable with aeration alone, the bed appeared to have a short-term memory after vibration was applied. This memory effect was apparent in an experiment where the bed was first fully fluidized with vibration and aeration, and then was allowed to settle down by turning off the vibration and aeration. This settled bed could then be fluidized by aeration alone as long as it was done within a few minutes, which is contrary to expectations given the Geldart Group C character of the primary particles. Thus, once the bed was fluidized with introduction of vibrational force, the interparticle networks in the original sample were disrupted and the resulting agglomerates did not form strong cohesive networks for several minutes, even after the bed was allowed to settle. However, if the bed was left longer than a few minutes in its rest state, it became difficult to fluidize the bed.

Figure 3:
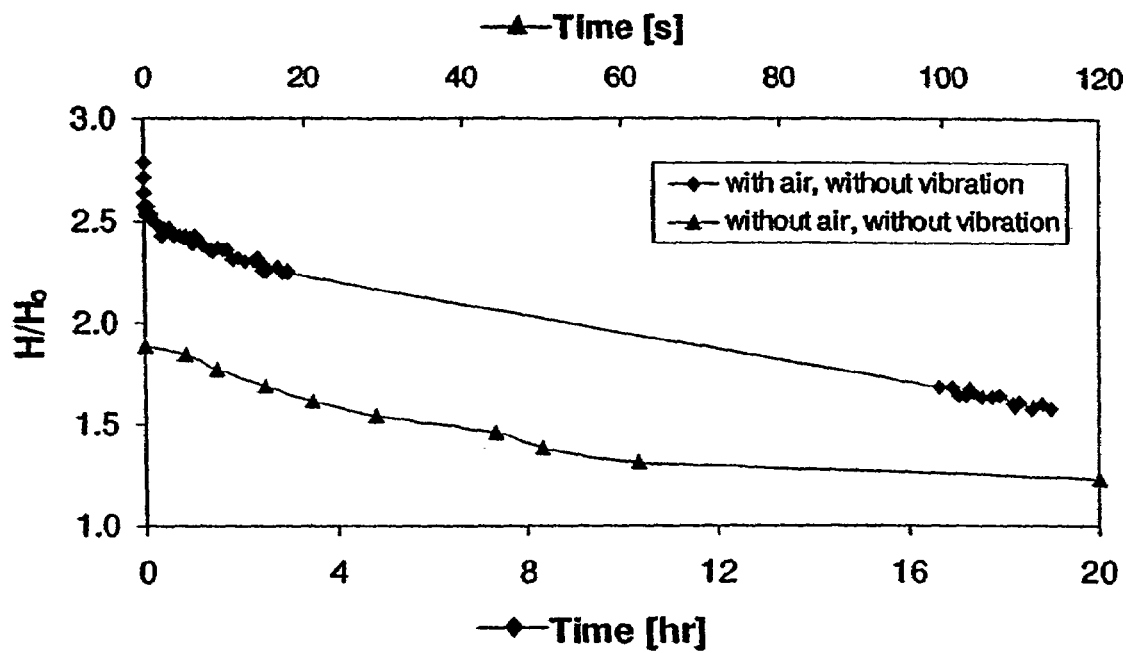
FIG. 3 is a plot showing bed height as a function of time with variations in aeration and vibration conditions according to an exemplary embodiment of the present disclosure.

Additionally, once the bed was fluidized with the aid of vibration and aeration, the vibration could be turned off and the bed would remain expanded and fluidized for a considerable amount of time (approximately 30 hours). FIG. 3 shows a comparison between the settling of a fully expanded bed after (a) aeration was left on and vibration was turned off, and (b) both aeration and vibration were turned off. Without both vibration and aeration, the bed collapsed to its initial height within two (2) minutes. Based on these experimental observations, it appears that once the interparticle forces are disrupted, it takes a finite time to return to the original undisturbed conditions.

In these experimental studies, the bed of nanoparticles, when aerated without vibration, exhibited plug flow, channeling, and spouting. When airflow was coupled with sufficient vibration (so that $\Gamma=(A\omega^2)/g>1$), the immobile bed would almost immediately begin to expand. More particularly, the channels would close, the spouting would stop, and/or the solid plug would break up. Increasing vibrational intensity, $\Gamma$, weakly affected bed height. The same phenomenon was also seen when only the top portion of the bed was used. At high vibration frequencies (f>100 Hz) and airflow rate, relatively large bubbles could be seen. At low frequencies (<50 Hz), many of the bubbles appeared to break and dissipate throughout the bed forming microbubbles (estimated to be about 200 μm). Bubbles were not seen to coalesce, grow or break the upper surface of the bed.

Figure 4:
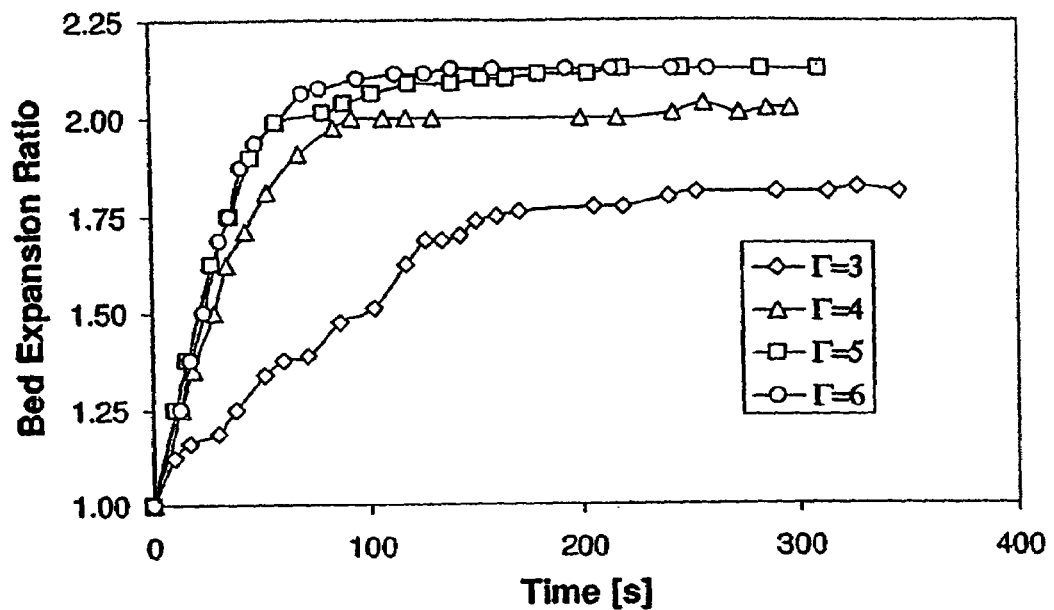
FIGS. 4(a) and 4(b) are plots showing bed expansion ratios as a function of time for different operating conditions according to an exemplary embodiment of the present disclosure.
Figure 4:
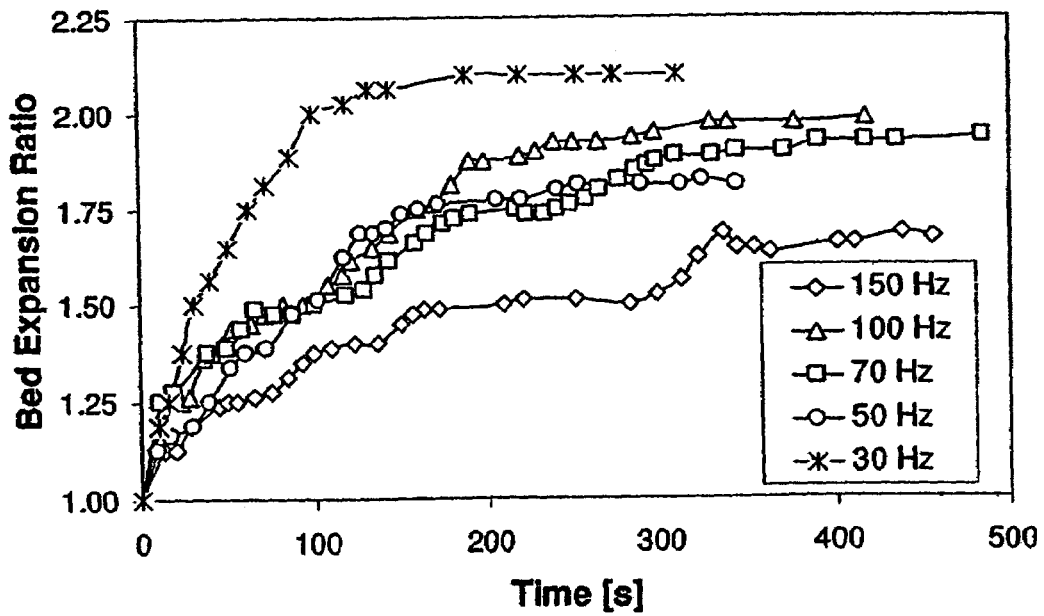

At modest fluidization gas velocities, the surface of the bed was very smooth, there was no apparent disturbance from bubbles and practically no elutriation of particles was observed. At higher gas velocities (>2 cm/s), the surface became unstable and elutriation of particles out of the tube could be observed. FIG. 4(a) shows bed expansion rate at different $\Gamma$ at a constant frequency of 50 Hz and constant superficial air velocity of 0.28 cm/s. In each experiment, the vibrational parameters were first set at the desired conditions, and then the aeration was turned on (at time t=0) at the desired superficial velocity. The steady state bed expansion increased with increasing $\Gamma$, but appeared to become independent of $\Gamma$ at sufficiently large values of $\Gamma$. In this series of experiments, the vibrational intensity was varied by changing the amplitude (A), while holding the frequency of vibration constant. This bed expansion behavior may be rationalized as follows: as the vibrational intensity was increased, the size of the agglomerate decreased at first and then became roughly independent of $\Gamma$, i.e., reached a state of dynamic equilibrium.

The scaled acceleration $\Gamma$ was not the only vibrational parameter affecting steady state bed expansion. FIG. 4(b) illustrates that the steady state bed expansion, at a constant superficial air velocity of 0.28 cm/s, depended on the frequency of vibration, even when $\Gamma$ was maintained constant; however, no systematic trend was manifest. It was found that at higher values of $\Gamma$, the effect of vibration frequency on the steady state bed expansion decreased. It is clear from FIGS. 4(a) and 4(b) that at least two dimensionless groups involving A and ω would be needed to capture the effect of vibration on fluidization behavior.

It is also clear from FIGS. 4(a) and 4(b) that the rate at which the bed expanded depended on the vibrational parameters. The higher the frequency or the lower the $\Gamma$, the slower the bed expanded. The rate of bed expansion was roughly the same for $\Gamma$=4-6, but appreciably smaller at $\Gamma$=3 (see FIG. 4(a)). As seen in FIG. 4(b), the rates of bed expansion at frequencies of 50, 70 and 100 Hz were comparable, while those at 30 and 150 Hz suggest an inverse dependence on the frequency.

Figure 5:
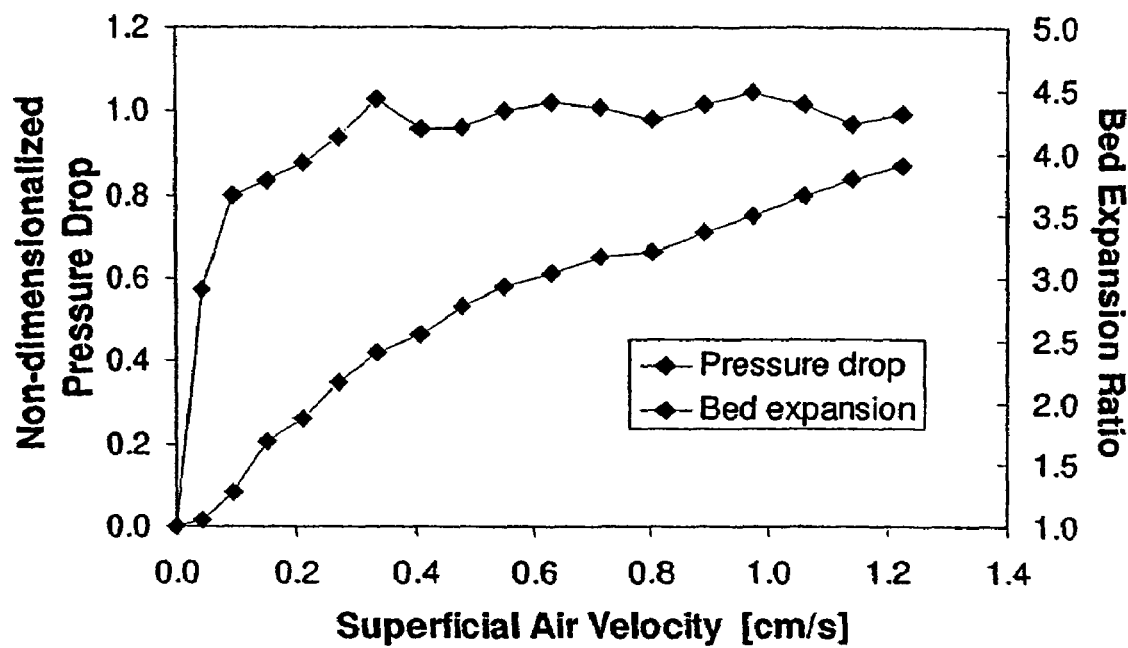
FIG. 5 is a plot showing pressure drop as a function of superficial air velocity under specified operating conditions according to an exemplary embodiment of the present disclosure.

In all of the experiments performed, the measured pressure drop across the bed at high gas velocities approximately equaled the weight of the bed per unit cross sectional area. FIG. 5 shows a typical set of results obtained in a vibrated fluidized bed of silica nanopowder, where both the pressure drop across the bed and the bed expansion at increasing gas velocities are presented. The pressure drop has been scaled with the actual measured weight of the bed per unit cross sectional area of the bed, while the bed height has been scaled with the height of the settled bed. It is clear from FIG. 5 that the pressure drop increased initially with gas velocity and then leveled off at high gas velocities. In the plateau region, the scaled pressure drop is very close to the expected value of unity. A lower measured pressure drop than the weight of the bed could be due either to a loss of powder sticking to the wall, powder elutriation, or possibly to some non-uniformities in the gas flow due to the relatively porous distributor that was used in the experiments. On the other hand, wall friction (Loezos et al., 2002) and cohesion between the bed of particles with a layer of particles adhering tightly to the distributor (Castellanos et al., 1999; Sundaresan, 2003) would result in a higher measured pressure drop than the weight of the bed. Our studies have revealed only a weak effect of vibrational parameters on the constant (plateau) pressure drop obtained at high gas velocities. Thus, there is no clear consensus on the effect of vibration on pressure drop across the bed.

FIG. 5 also shows that bed expansion behavior in an exemplary system according to the present disclosure was different than that observed with Geldart group A particles where bed expansion begins only after the minimum fluidization velocity is exceeded. As soon as a vibrofluidized bed (with $\Gamma$>1) was aerated, it began to expand even though the actual gas phase pressure drop was only a fraction of the bed weight per unit cross sectional area. As gas flow rate was increased, the bed continued to expand and this was accompanied by a systematic increase in the gas phase pressure drop. The bed expansion continued into the constant pressure drop regime. The overall bed expansion could be in excess of five times the original height, and even at such dramatic bed expansion levels the quality of fluidization appeared to be smooth.

Based on an agglomerate size of about 50 microns, the Reynolds number is less than 1. A number of studies (Mawatari et al., 2002; Noda et al., 1998; Tasirin et al., 2001; Erdesz et al., 1986) have found that, as the vibration intensity, $\Gamma$, is increased, the minimum fluidization velocity is decreased. Here, minimum fluidization velocity refers to the lowest gas velocity for which the pressure drop across the bed becomes constant. However, in experiments according to the present disclosure (with $\Gamma$>1), frequency and other vibrational parameters had only a small effect on the minimum fluidization velocity, and this effect became unobservable as $\Gamma$ was increased.

In the exemplary experimental studies of the present disclosure, the minimum fluidization velocity (based on the definition above) was determined to be around 0.3-0.4 cm/s (see FIG. 5). However, it is noted that the bed exhibited fluid-like properties as soon as it started to expand at velocities as low as 0.1 cm/s. Such a minimum fluidization velocity cannot be obtained empirically based on the primary particle size, which demonstrates unequivocally that the disclosed system is only fluidizing agglomerates.

Since agglomerates are being fluidized according to exemplary embodiments of the present disclosure, it is valuable to identify the manner in which voidage is defined. According to the present disclosure, voidage, $\epsilon$, is defined as the fraction of the total bed volume occupied by the fluid. Using 0.03 g/cm³, and 2.2 g/cm³ for the bulk density of a settled bed and primary nanoparticles density, respectively, it is possible to calculate that $\epsilon$~0.9864. Thus, the bed of nanoparticles is already highly fluffy even before fluidization. As the bed expands, $\epsilon$ increases to above 0.99. The agglomerate themselves were very porous.

In a further experimental study according to the present disclosure, a small amount of silica was dyed blue with methylene blue for mixing/tracer experiments. In such experimental study, the progression of mixing of a small layer of blue particles placed at the top of the vibrated fluidized bed was observed. Within a few minutes, the entire bed turned blue and appeared well mixed, even though aeration was applied at a level well below the minimum fluidization conditions. This result clearly showed that even in the region where the gas phase pressure drop was considerably smaller than the bed weight per unit cross sectional area, active mixing of the agglomerates occurred.

Preliminary SEM and EDX analyses showed that the agglomerates were well mixed, at least on the agglomerate level, indicating that vibrofluidization could be used to mix agglomerates of different species of nanoparticles. For example, nano-silica has been effectively mixed with nano-titania and nano-molybdenum oxide. It is not known if the agglomerates retained their integrity during fluidization or if they broke and formed again rapidly; in the former case, one would achieve little mixing at the nano-scale. However, if mixing were indeed observed on a scale smaller than the agglomerate size, it would be indicative of fragile agglomerates, which broke and formed repeatedly in a vibrofluidized bed.

Thus, according to the preceding experimental studies, it has been demonstrated that nanosized silica could be easily and smoothly fluidized in the form of stable, very porous agglomerates with negligible elutriation with the aid of vibration and aeration. Since the bed remained fluidized for a considerable amount of time with only air flow after vibration was turned off, vibration appeared to be necessary only initially to disrupt interparticle network and establish a desired particle size distribution, after which aeration was sufficient to sustain the bed in a fluidized and expanded state for an extended period of time, i.e., a dynamic equilibrium was established. The mixing studies described above show that the application of vibrofluidization of nanoparticles to mix different nanoparticles together to form nanocomposites also yields promising and advantageous results.

In another preferred aspect of the present invention, the apparatus 1 may be well suited for aerated-magnetically assisted fluidization. In this aspect of the invention, the apparatus 1 may preferably be substantially similar to that previously identified and/or described. However, the vibration source 4 may preferably be either replaced by or supplemented with the magnetic source 6 preferably having one or more magnetic elements or particles, such as, for example, barium-ferrite polyurethane coated magnets. Other magnetic particles may also be used whose sizes range from about 0.5 to about 5.0 mm. The magnetic source 6 also preferably has one or more magnetic field generators preferably surrounding a base portion 17 of the fluidization bed chamber 14.

In this aspect of the invention, the energy dissipated from the collisions and/or spins of the magnetic particles due to interaction with a magnetic field induced by the magnetic field generators may be utilized to facilitate effective fluidization of nanoparticles. Further, utilizing different loads of the magnetic particles may be an effective way to affect the energy inputted into the fluidization bed chamber 14. That is, the more magnetic particles used, the greater the energy provided. The magnetic field may also be varied in order to change the energy input. The magnetic field may, in one aspect of the invention, be induced via a copper coil, for example, to induce an oscillating magnetic field strength of approximately 40 mT.

Typical magnetic particles may comprise hard barium ferrite ($BaO.6Fe_2O_3$), AlNiCo, rare earth metals, ceramics or various mixtures thereof. Such magnetic particles preferably have coercivities ranging from about 200 to about 3000 oersteds. In order to minimize the attrition of the magnetic particles and the attrition by them on the container walls and screen, it may be preferable to provide a soft coating over the magnetic particles. For example, the magnetic particles may be coated with polymeric materials such as, for example, cured epoxy or polytetrafluoethylene, to smooth the surface and make the magnetic particles more durable and resistant to wear. The magnetic particles may also be comprised of magnetic powder embedded in a polymeric matrix, such as barium ferrite embedded in sulfur cured nitrile rubber such as ground pieces of PLASTIFORM™ Bonded Magnets, available from Arnold Engineering Co., Norfolk, Nebr. The size of the magnetic particles may vary from about ten times to about thousand times the size of the powder material to be fluidized. The appropriate size of the magnetic particles may depend on and/or be based on the type of application, the density of the powder material, and/or the cohesive strength of the powder material. The appropriate size of the magnetic particles may be readily determined by one skilled in the pertinent art. The shape of the magnetic particles may also vary, and may be spherical, elongated, irregular or other suitable shape.

The quantity of the magnetic particles required may be dependent on the quantity of the powder material to be moved, the bulk density of the particular powder material, the cohesiveness of the particular powder material, and/or environmental factors such as moisture, temperature, or time of consolidation. Preferably, only that quantity of magnetic particles needed to cause the powder material near the container outlet zone to move and/or flow may be used. In general, the weight of the magnetic particles should be approximately equal to the weight of the powder material near the outlet zone, for example, if a conical bottomed hopper is used, the weight of the magnetic particles should be approximately equal to the weight of the powder material in the lower half of the conical section. However, the amount or weight of magnetic material may be less or more depending upon the nature of application.

The magnetic field generator(s) may preferably be supplied with power by means of oscillators, oscillator/amplifier combinations, solid-state pulsating devices and/or motor generators. A magnetic field may preferably be generated by means of a solenoid coil, an air core or laminated metal cores, and/or stator devices or the like. Further, the in a preferred aspect of the present invention, the magnetic field generator(s) may have one or more AC motor stators, i.e., motors preferably with armatures removed, which may be powered by an alternating current supply through variable output transformers. In addition, metal strips may be placed outside the magnetic field generator(s) to preferably confine the magnetic field to a specific volume of space. The magnetic field preferably oscillates either by changing the value in a sinusoidal fashion but keeping the direction the same, or by changing the direction of the field itself, so that the field rotates. The oscillating magnetic field can be caused, for example, by using multiphase stators to create a rotating magnetic field, as disclosed in U.S. Pat. No. 3,848,363 to Loveness, or by using a single phase magnetic field generator with an AC power supply at a specified frequency to create a bipolar oscillating magnetic field. In highly cohesive powder materials, a rotating field is preferred because the magnetic particles do not have a possibility of not being moved due to having an alignment with the direction of the field as in a bipolar field.

A useful magnetic field is preferably one with an intensity sufficient to cause desirable motion and excitation of the magnetic particles, but not large enough to demagnetize the magnetic character of magnetic particles that are moved by the oscillating magnetic fields. The magnetic field intensity may range between about 1 oersted and about 3000 oersteds, preferably between about 200 and about 2500 oersteds.

An important characteristic of the magnetic field may be defined by the frequency of oscillations. The frequency of oscillations in the oscillating magnetic field affects the movement and subsequently the number of collisions that take place between a magnetic element preferably moved in the magnetic field and the surrounding powder material/particles preferably caused to move and/or to be fluidized. If the oscillating frequency is too low, the magnetic particles may move too slowly and may not have sufficient motion to cause the other powder material to flow. If the oscillating frequency is too high, the magnetic particles may not be able to spin in the fast changing field due to their inertia. The frequency may be from about 5 hertz to about 100,000 hertz, preferably from about 50 hertz to about 1000 hertz, and even more conveniently at the hertz which is commonly used in AC power supplies (i.e., 50 hertz, 60 hertz, and/or 400 hertz).

Having identified and/or described some of the various aspects associated with this exemplary aspect of the present invention, different methods of preparation and processing applications are now discussed.

Depending on the bed chamber size, a measured amount of nano-sized powders may be carefully placed in the bed chamber 14 preferably above the distributor 12. The bed chamber 14 may of any suitable shape or configuration (e.g., tubular (3D) or rectangular (2D)) and may preferably be placed vertically in operative association with the equipment (i.e., the vibration source 4 and/or the magnetic source 6). The distributor 12 may be made of several materials and take a variety of different forms. For example, the distributor 12 may be a sintered metal disk, a ceramic porous plate, or simple wire meshes or clothes, all with apertures preferably small enough (usually less than about 40 microns) to distribute the fluidizing medium as evenly as possible. Highly cohesive nanoparticles may not appreciably fall through the distributor 12. The top of the bed chamber 14 may be sealed with a cap and hose or tube, for example, leading to the vent 16 in case of any powder elutriation, which may occur at relatively high velocities. Once the bed chamber 14 is operatively connected to the vibration source 4 and/or the magnetic source 6, the vibration and/or magnetic field may be set at the desired settings (e.g., acceleration, frequency, etc.). Preferably, when the bed chamber 14 operatively cooperates with the vibration source 4 and/or with the magnetic source 6 at the desired parameters, an air flow may be slowly turned on. One may verify effective fluidization using bed chamber expansion and pressure differentials. That is, not only does the bed chamber expand to provide a good indicator of fluidization, but the pressure drop may also be a good indicator when it equals the weight of the bed chamber per unit area. Pressure taps may be drilled into the bed chamber at various desired heights thereof so that pressure drops across different places of the bed chamber may be obtained or quantified. One should remember that if the measured pressure drop includes the distributor 12, the pressure difference of the distributor 12 must be subtracted from the total pressure drop recorded to obtain the drop across the powder bed. If a dense layer forms at the bottom of the bed chamber 14 near the distributor 12, the top portion of the powder bed may be elutriated or physically taken out with an aspirator, for example, for later use in other applications (e.g., experiments without another dense layer forming). During successful fluidization in accordance with one or more aspects of the present invention, samples may be taken for testing and analysis with SEM, EDX, TEM, EELS, etc. Average size, an overall mapping of the composition, and/or the degree of mixing may be obtained using such techniques. It is noted that if the powder material used is energetic, different and appropriate means of analysis may be used and extra caution should be taken when using energetic materials for fluidization. For example, an electrostatic charge may be significantly decreased using a DC nozzle that can ionize the fluidizing medium (e.g., air). Nonetheless, energetic samples such as, for example, nano-aluminum and nano-sized molybdenum oxide (MIC) may also be fluidized and well mixed in accordance with one or more aspects of the present invention.

This system is applicable at temperatures that range from about −100 degree C. to about 2000 degree C. and pressures that range from about 0.2 bars to about 2000 bars. The temperature and/or pressure may be limited mainly by the particular material being fluidized and/or the materials used in constructing the apparatus 1. Preferably, ambient temperatures and/or pressures (e.g., room temperature and/or atmospheric pressure) may be utilized. Humidity should preferably be regulated so that moisture may be kept to a minimum. The presence of moisture may affect agglomeration of the powder material, although some humidity may be helpful to minimize electrostatic charges. After the fluidization process is completed, the powder material may preferably be collected in a clean container.

Additional experimental studies directed to the introduction of magnetic forces using an oscillating AC magnetic field to excite relatively large (mm size) magnetized particles mixed in with nanoparticles agglomerates to effect fluidization are further described herein. As demonstrated by such experimental studies, with the aid of an oscillating at low frequencies, the bed of nanoparticle agglomerates can be smoothly fluidized, and the minimum fluidization velocity may be significantly reduced. In addition, channeling or slugging of the bed disappears and the bed expands uniformly without bubbles and with negligible elutriation. The bed expansion and the minimum fluidization velocity depend on the mass ratio of magnetic particles to nanoparticles, and the intensity and frequency of the oscillating magnetic field. The effects of the intensity and frequency of the oscillating magnetic field and the weight ratio of magnets to non-magnetic nanoparticles are described herein, as well as important fluidization parameters (such as the minimum fluidization velocity, pressure drop across the bed, and bed expansion) in such systems are demonstrated. Unlike traditional magneto-fluidized beds, the magnetic particles used according to the present disclosure are permanent magnets, which furiously spin and create intense shear and agitations under an oscillating magnetic field.

The experimental system utilized herein consisted of a fluidized bed of nanoparticle agglomerates, an oscillating electromagnetic field and a visualization apparatus. The fluidized bed was a vertical transparent column with a distributor at the bottom. The column was a section of acrylic pipe with an inner diameter of 57 mm and a height of 910 mm. The distributor was a sintered metal plate of stainless steel with a thickness of 2 mm and pore size of 20 μm. To generate a uniform gas field before the distributor, glass beads of diameter between 2.5 and 3.5 mm were charged into a chamber placed below the distributor and above the gas inlet to form a packed bed about 100 mm high. An ultra-fine mesh filter was located at the gas outlet to filter out any elutriated nanoparticle agglomerates.

The fluidization behavior was visualized with the aid of a lighting device (Illumination Technologies, Model 150SX) and recorded by a digital camcorder (Sony, Digital 8). The magnetic particles were barium ferrite (BaO-6Fez03) coated with polyurethane (supplied by Aveka, USA), about 1.0-3.0 mm in size. These were permanent magnetic particles, which were recharged by contacting them with a strong permanent magnet before each experiment and were then added to the bed of nanoparticles at a prescribed mass ratio. The shafts of two 1/20 HP electric motors (Dayton 5M064B) were removed and the electromagnetic coils were placed opposite one another around the lower part of the vertical transparent column by mounting them on an acrylic plate which holds the distributor. The coils were driven by an alternating current generated by a power supply and were capable of generating an oscillating magnetic field with an intensity up to 140 Gauss at the center of the coil. The power supply (Triathlon Precision AC Source) was rated to supply AC current with adjustable frequency and voltage. A strong cooling fan (Comair Rotron TNE2A) was used to prevent the coils from overheating.

Fumed $SiO_2$ nanoparticles (Degussa Aerosil@ R974) with a primary particle size of 12 nm and a bulk density of about 30 $kg/m^3$ were used in these experimental studies. Due to surface treatment by the manufacturer, the nanoparticles were hydrophobic. Before the experiments, the particles were sieved using a shaker (Octagon 2000) and a 35-mesh sieve opening (about 500 µm). The sieving process functioned as a "pretreatment" step with respect to the nanoparticle feedstock and served to separate very large agglomerates, which may have been generated during packing, storage, and transportation. The selection of a mesh opening of 500 µm was based on previous experimental findings that the typical size of fluidized nanoparticle agglomerates is between 100 to 400 µm. The size range of the fluidized nanoparticle agglomerates was measured by analyzing digital images of the fluidized agglomerates with the help of a laser source (Laser Physics Reliant 1000 m), a CCD camera (LaVision FlowMaster 3S), and an image processing system (Dual Xeon CPU).

For purposes of the present disclosure, the smaller nano-agglomerates that pass through the openings of the 500 µm sieve are designated as "soft" and the larger agglomerates, from about 500 µm to more than 10 mm are designated as "hard". These two different sized agglomerates and a "mixture" consisting of 80% soft agglomerates and 20% hard agglomerates by weight (80/20) were selected to conduct the fluidization experiments described herein.

To minimize any effect of humidity on the fluidization experiments, pure nitrogen from a compressed $N_2$ tank was used as the fluidizing gas. The gas flow rate was measured and adjusted by two calibrated rotameters (Gilmont) with a combined flow rate range of up to 51.0 liters per minute. The pressure drop across the bed was measured with a differential pressure transmitter (Cole-Parmer) with a measurement range of up to 1.0 inch of water; the lower pressure tap was placed slightly above the distributor (approximately 3 mm), so that it was not necessary to measure the pressure drop across the distributor. A Gaussmeter (Walker Scientific Inc. MG-3A) with a range of from 1 to $10^4$ G was used to measure the intensity of the oscillating magnetic field, which was measured at the center point between the coils in the empty column (before charging the nanoparticles into the bed).

We have found that, even when using the same nanoparticles, if the experiments are run with agglomerates of different sizes, the bed shows very different fluidization behavior. For example, the soft R974 agglomerates fluidize smoothly with large bed expansion (APF) at a low minimum fluidization velocity of 0.23 cm/s. Here, we define the minimum fluidization velocity as the gas superficial velocity beyond which the bed pressure drop is no longer dependent upon the gas velocity and becomes constant, and a relatively large bed expansion (typically 2 or more times the initial bed height) occurs. A mixture consisting of 80% soft agglomerates and 20% hard agglomerates (80/20) also behaves as APF, but the minimum fluidization velocity is much higher (5.67 cm/s) than that of the soft agglomerates. However, the hard R974 agglomerates do not fluidize at all, even at a gas velocity as high as 13.2 cm/s. At this high gas velocity, significant particle elutriation was observed, and the fluidization experiment had to be interrupted to avoid large losses of nanoparticles.

Figure 6:
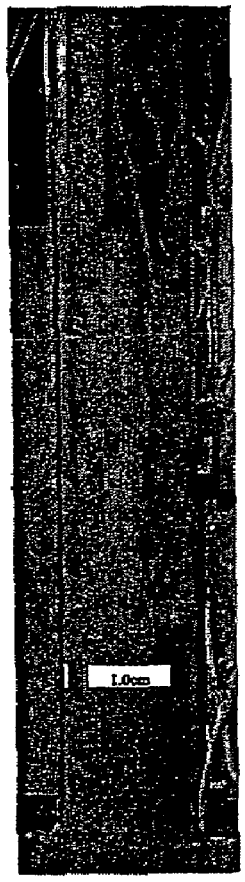
FIGS. 6(a) and 6(b) are photographic images of fluidization performance with and without the introduction of a magnetic field.
Figure 6:
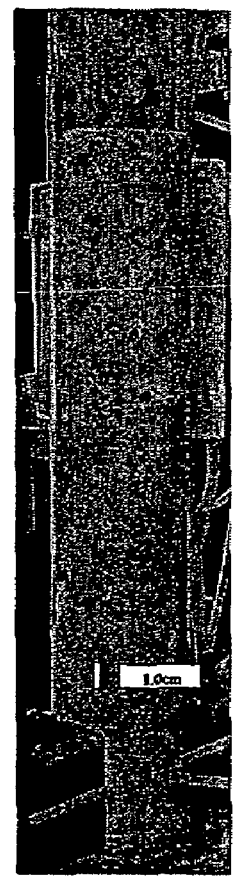

Typical fluidization behavior of the 80/20 mixture of $SiO_2$ nanoparticle agglomerates with and without the external oscillating magnetic excitation are shown in the photographic images of FIGS. 6(a) and 6(b), respectively. Without the external oscillating magnetic excitation, at a superficial gas velocity of 0.65 cm/s (FIG. 6(a)), the nanoparticle agglomerates are first lifted as a plug and then the plug disintegrates to form undesirable, stable channels through which the gas passes; the bed expands slightly with an uneven surface and the pressure drop is much less than the bed weight, indicating that the nanoagglomerate bed is not fluidized.

However, if a sufficiently strong oscillating magnetic field is applied, the magnetic particles are set in motion (translation and rotation) and the nanoparticle agglomerates are fragmented into smaller agglomerates because of collisions with the magnets, the vessel wall, and the distributor. After a few minutes, the particle size distribution of the nanoparticle agglomerates are brought into a desirable range, the channels disappear, and the bed begins to expand slowly and uniformly until it reaches its full expansion, of up to five (5) times the initial bed height. At the same time, the pressure drop reading is very close to the weight of the bed, indicating fluidization of the entire bed. A homogenous fluidization state is established, as shown in FIG. 6(b), and the surface is very smooth and even. After the experiment, the powder was poured out and, from visual observation, most of the original large hard agglomerates are gone and the average agglomerate size appears very much smaller.

Figure 7:
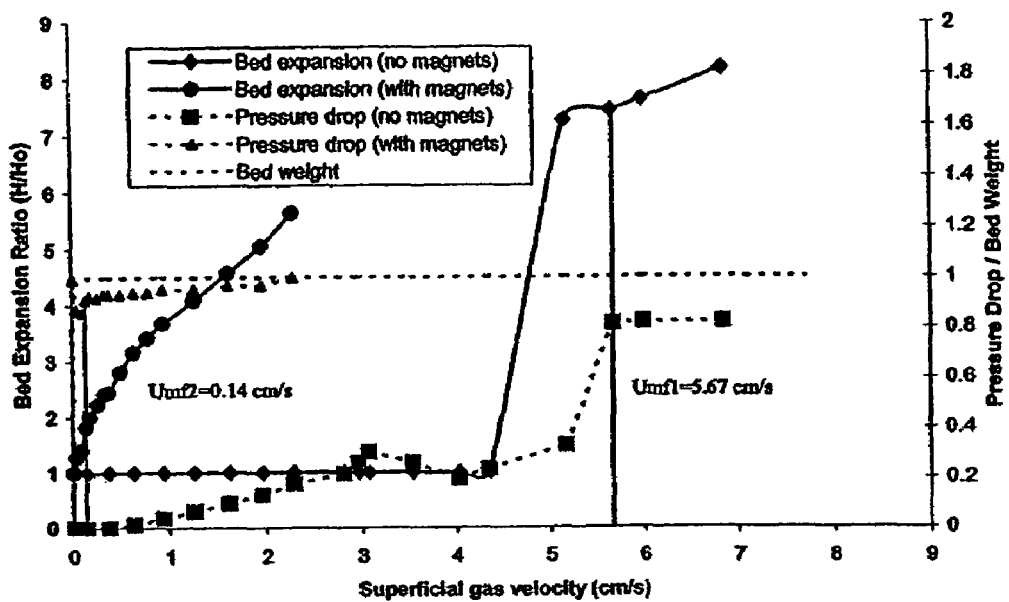
FIG. 7 is a plot showing bed expansion ratio and pressure drop for fluidization systems with and without magnetic excitation.

The pressure drop normalized with the bed weight per unit area and the bed expansion ratio as a function of superficial gas velocity through the bed are shown in FIG. 7 (with and without magnetic excitation). As shown therein, solid lines reflect bed expansion ratios and dashed lines reflect pressure drops. The magnetic field intensity was 140 G at the center of the field, and the mass ratio of magnets to nanoparticles was 2:1 (with AC frequency of 60 Hz). With further reference to FIG. 7, $U_{mf1}$ represents the minimum fluidization velocity without magnetic excitation, whereas $U_{mf2}$ represents the minimum fluidization velocity with magnetic excitation. It is clear from FIG. 7 that the magnetic excitation causes the bed to expand almost immediately as the velocity is increased and the bed fluidizes at a velocity more than one order of magnitude lower than that without magnetic assistance.

Figure 8:
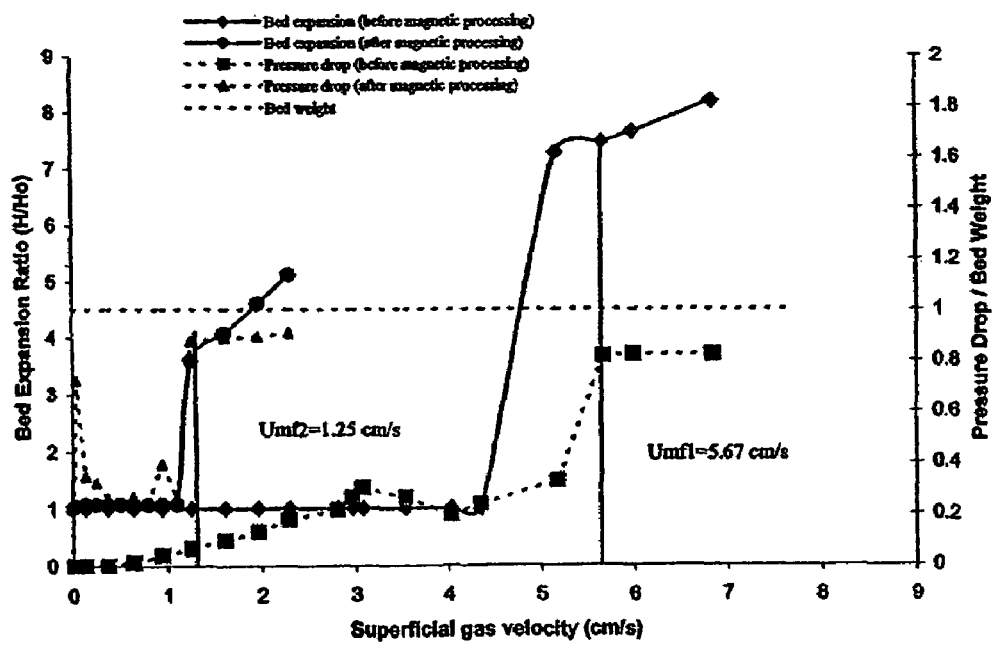
FIG. 8 is a plot showing bed expansion ratio and pressure drop for conventional fluidization of an 80/20 mixture before and after magnetic processing.

After separation from the magnetic particles, the nanoparticle agglomerates were recharged back into the column, and a second fluidization experiment without magnetic assistance is conducted using these agglomerates. FIG. 8 is a comparison of the fluidization characteristics of the 80/20 mixture, before and after magnetic processing. Solid lines represent bed expansion ratios and dashed lines represent pressure drops. The magnetic field intensity was 140 G at the center of the field and the mass ratio of magnets to nanoparticles was 2:1 (AC frequency of 60 Hz). A significant reduction in the minimum fluidization velocity from 5.67 cm/s (before magnetic "fragmentation" processing) to 1.25 cm/s (after magnetic "fragmentation" processing) is observed, indicating that previous fluidization with magnetic assistance causes the agglomerates to be fragmented into smaller ones and the average agglomerates size is reduced. However, the minimum fluidization velocity of these smaller agglomerates is still about an order of magnitude larger than the minimum fluidization velocity observed when the magnetic assistance is turned on.

Figure 9:
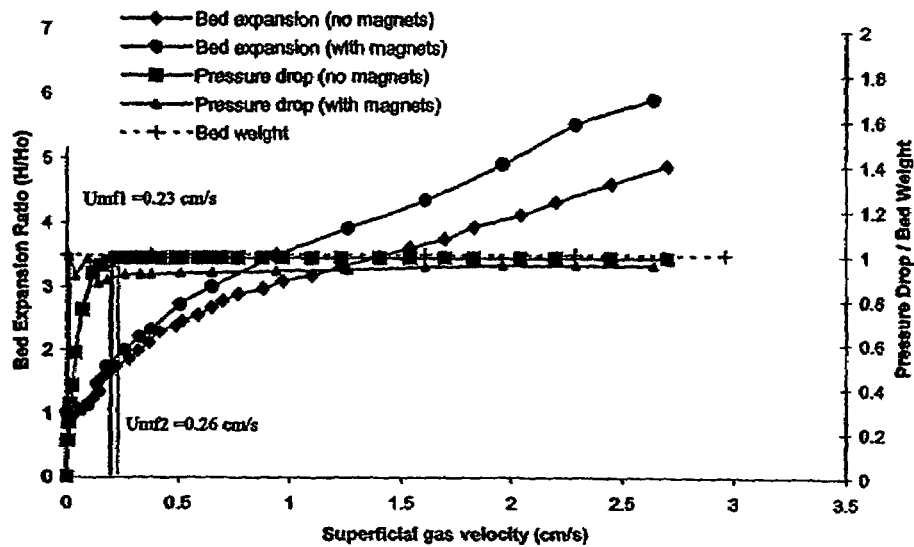
FIG. 9 is a plot showing bed expansion ratio and pressure drop for "soft" agglomerates with and without magnetic excitation.

The fluidization behavior of exemplary soft agglomerates is shown in FIG. 9. Solid lines represent bed expansion ratios and dashed lines represent pressure drops. The magnetic field intensity was 140 G at the center of the field and the mass ratio of magnets to nanoparticles was 2:1 (AC frequency of 60 Hz). $U_{mf1}$ represents the minimum fluidization velocity without magnetic excitation, whereas $U_{mf2}$ represents the minimum fluidization velocity with magnetic excitation. The much smaller agglomerates fluidize well with and without magnetic excitation. In both cases, the minimum fluidization velocities appear to be quite close to each other, but at higher gas velocities (above minimum fluidization velocity), the bed expansion with magnetic assistance is higher than that without magnetic assistance. It is also noted that the ratio of the measured pressure drop to the weight of the bed per unit area is below unity for magnetic assisted fluidization. This may mean that some of the nanoagglomerates are not participating in the fluidization and may be sticking to the magnets.

Figure 10:
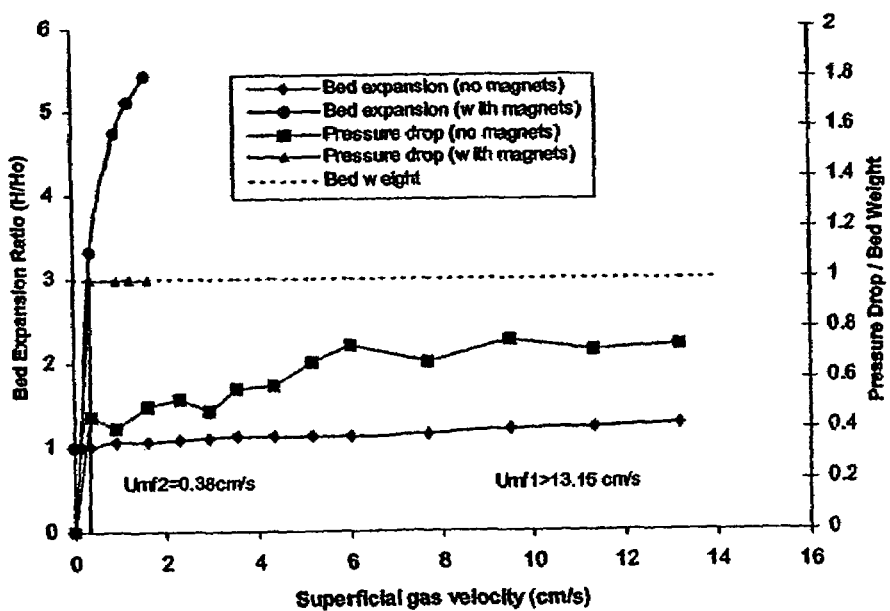
FIG. 10 is a plot showing bed expansion ratio and pressure drop for "hard" agglomerates with and without magnetic excitation.

FIG. 10 shows the typical fluidization behavior (pressure drop and bed expansion) of hard $Sio_2$ nanoparticle agglomerates (R974) with and without magnetic excitation. Solid lines represent bed expansion ratios and dashed lines represent pressure drops. The magnetic field intensity was 140 G at the center of the field and the mass ratio of magnets to nanoparticles was 2:1 (AC frequency of 60 Hz). $U_{mf1}$ represents the minimum fluidization velocity without magnetic excitation, whereas $U_{mf2}$ represents the minimum fluidization velocity with magnetic excitation. The size of the hard agglomerates was in a wide range, from 0.5 mm to about 10 mm. Without the magnetic excitation, even at superficial gas velocity as high as 13.2 cm/s, the hard agglomerates could not be fully fluidized. Visual observation reveals that the smaller hard agglomerates are in motion at the top of the bed, but the larger agglomerates remain at the bottom of the bed, causing the gas to flow in large channels between them. The bed showed almost no expansion and the pressure drop was much less than the bed weight, indicating that the bed was not fluidized.

After turning on the external magnetic field, however, the large agglomerates become smaller and smaller due to fragmentation (disruption of interparticle forces) caused by collisions with the magnetic particles, and these smaller agglomerates participate in the circulation of the bed. After a few minutes, the nanoparticle size distribution reaches a desired range and assumes a dynamic equilibrium. From that point, even at the relatively low gas velocity of 0.94 cm/s, all of the large agglomerates disappear, and the bed expands slowly and uniformly until it reaches full expansion, while the pressure drop reading is very close to the weight of the bed, indicating that the entire bed is fluidized.

Figures 11, 17:
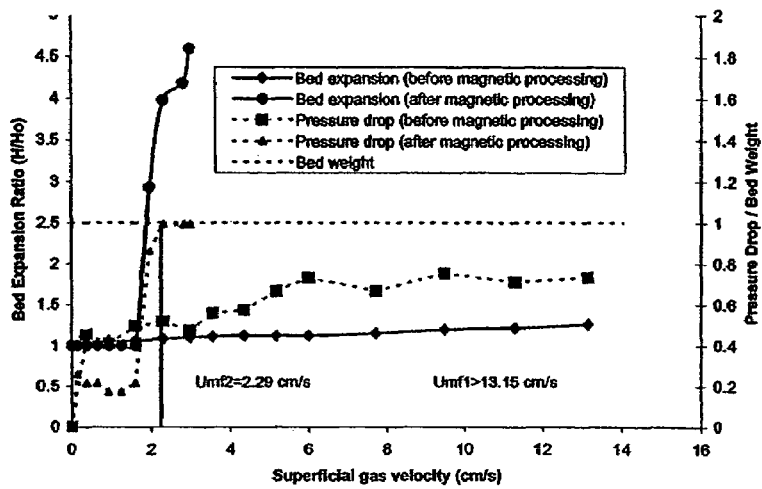
FIG. 11 is a plot showing bed expansion ratio and pressure drop for conventional fluidization of "hard" agglomerates before and after magnetic processing.
FIG. 17 is a table showing minimum fluidization velocities and bed expansion ratios for "soft" agglomerates with different frequencies.

The fragmentation caused by the magnetic processing is so obvious that the reduction in size of the hard agglomerates could be seen by inspection after the magnetic field and air flow were shut down. Upon removing the magnetic particles, the nanoparticle agglomerates are recharged into the chamber and a conventional fluidization experiment (no magnetic assistance) is performed. FIG. 11 is a comparison of the fluidization characteristics between the powder before and after undergoing a magnetic assisted fluidization (fragmentation) process according to the present disclosure. Solid lines represent bed expansion ratios and dashed lines represent pressure drops. The magnetic field intensity was 140 G at the center of the field and the mass ratio of magnets to nanoparticles was 2:1 (AC frequency of 60 Hz). $U_{mf1}$ represents the minimum fluidization velocity before magnetic fragmentation processing, whereas $U_{mf2}$ represents the minimum fluidization velocity after magnetic fragmentation processing. A very large reduction in the minimum fluidization velocity ($U_{mf}$) from greater than 13.2 cm/s to 2.29 cm/s indicates that the average agglomerates size has been significantly reduced through the magnetic fragmentation processing.

The $U_{mf}$ for the hard agglomerates after magnetic processing is 2.29 cm/s, which is larger than the $U_{mf}$ of 1.25 cm/s for the 80/20 mixture, and also much larger than the $U_{mf}$ of 0.23 cm/s for the soft agglomerates. This indicates that the average size of hard agglomerates and of the mixture after the fragmentation process is still larger than that of the soft agglomerates. Hence, in order to only investigate the effect of magnetic excitation (e.g., magnet to nanoparticle mass ratios, AC frequencies, and different magnetic field intensities), and to minimize the influence of non-uniformity of the initial agglomerate size distribution, the soft agglomerates represent a good choice to conduct the comparison experiments.

At low gas velocities, conventional fluidization (no magnetic assistance) of soft agglomerates or of the 80/20 agglomerate mixture, produced only slugging and channeling, while at sufficiently high gas velocities, the bed can be fluidized smoothly. If the gas velocity is increased above a certain level, bubbles can be observed in the fluidized bed. Fluidization of nanoparticle agglomerates occurs due to the disruption of interparticle forces by the large hydrodynamic forces generated at high gas velocities. However, for conventional fluidization of hard agglomerates, even at a very high gas velocity, the bed could not be fully fluidized.

The mechanism of fluidization with the assistance of an oscillating magnetic field is two-fold: (1) fragmentation of large agglomerates into smaller ones, and (2) transferring kinetic energy generated by the oscillating magnetic excitation to the nanoparticle agglomerates due to collisions to disrupt the large interparticle forces between them. The table of FIG. 12 presents a summary of the minimum fluidization velocities for the soft, hard and 80/20 agglomerate mixture. For the soft agglomerates, magnetic excitation has little effect, but it produces a definite improvement in fluidization behavior for the 80/20 mixture. Even for the hard agglomerates, magnetic excitation changes the fluidization characteristics significantly, from no fluidization to smooth, bubble-less, agglomerate particulate fluidization (APF) with very large bed expansion up to five (5) times the initial bed height.

The minimum fluidization velocity is also significantly reduced from higher than 13.2 cm/s to 0.38 cm/s. Without magnetic excitation, at a gas velocity of 13.2 cm/s or higher, extremely strong elutriation could be observed, while with magnetic excitation, at the low gas velocity of 0.38 cm/s, elutriation was negligible. The substantial reduction in the minimum fluidization velocity resulting in smooth and bubble-less fluidization with little elutriation offers significant benefits for industrial applications where good mixing and high rates of heat and mass transfer with little gas by-passing are required.

Moreover, optical measurements demonstrate that the mean agglomerate size of the decreases by roughly 100 μm during magnetic processing (from mean measurement of 315 μm to mean measurement of 196 μm). As shown in the plots of FIGS. 13(a) and 13(b), the agglomerate size distribution is advantageously shifted downwards through magnetic processing according to the present disclosure, establishing a dynamic equilibrium that facilitates effective bed fluidization. FIG. 13(a) reflects the particle size distribution for a "soft" agglomerate system without magnetic field application (i.e., control) and FIG. 13(b) reflects particle size distribution with magnetic field application (140 G, 60 Hz, mass ratio of magnets to nanoparticles of 2:1). The data reflected in FIGS. 13(a) and 13(b) was generated through in situ optical measurements on the fluidized bed surface.

Figure 14B:
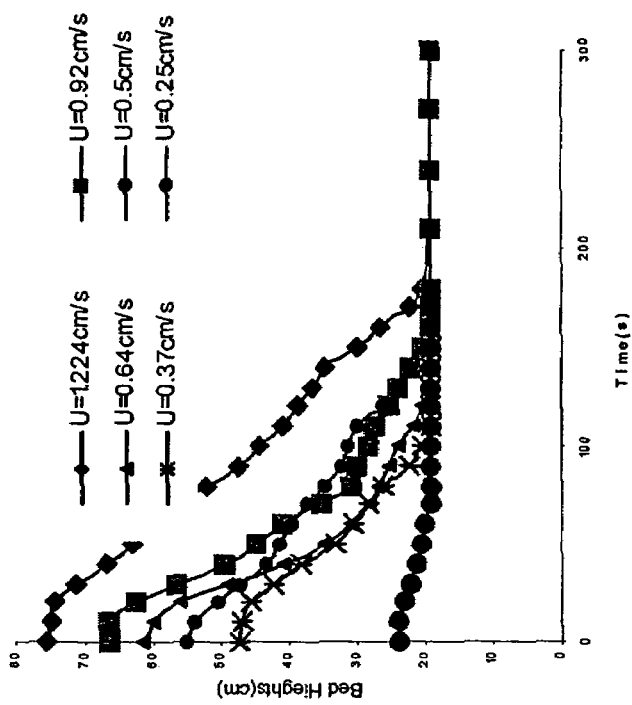
FIGS. 14(a) and 14(b) are plots showing bed expansion and collapse for a soft agglomerate system with magnetic excitation according to an exemplary embodiment of the present disclosure.
Figure 14A:
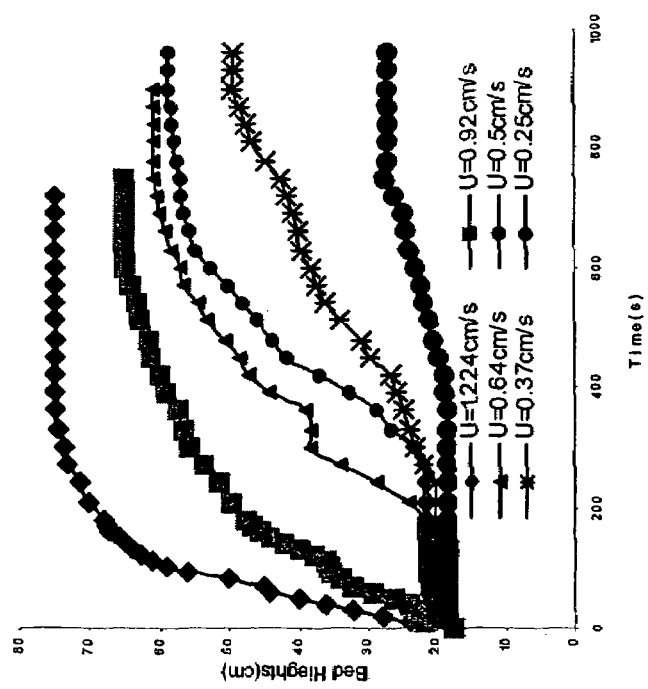

According to experimental observation, when the magnetic excitation is turned on (140 G, 60 Hz; 2:1 ratio of magnets to nanoparticles), the fluidization behavior of the nanoparticle bed does not change immediately, and it will take several minutes for the bed to begin expanding. The fluidized bed does not reach full expansion for a period of about 5 to 15 minutes, i.e., a state of dynamic equilibrium. The bed expansion as a function of time for R974 silica at different gas velocities is shown in FIG. 14(*a*); the higher the velocity, the quicker the bed expansion. Similarly, when turning off the magnetic excitation, it also takes a short period of time, typically 10-30 seconds, for the bed to begin to collapse, and the collapse will last from 1 to 3 minutes before reverting back to a fixed bed with uneven surface. The bed collapse as a function of time is shown in FIG. 14(*b*); the higher the gas velocity, the longer it will take for the bed to collapse.

Additional fluidization experiments with magnetic assistance (140 G, 60 Hz) were conducted using soft agglomerates for four different mass ratios of magnets to nanoparticles, varying from 1:4 to 2:1. The table of FIG. 15 presents the values of $U_{mf}$ and the bed expansion ratios at two different gas superficial velocities that were observed for these four cases. This table shows that the minimum fluidization velocity and bed expansion depends on the magnet to nanoparticles mass ratio, with $U_{mf}$ decreasing from 1.61 cm/s to 0.26 cm/s as the mass ratio increases from 1:4 to 2:1. This reduction indicates that adding more magnetic particles to the bed results in more kinetic energy transported from the magnets to the nanoagglomerates, causing more fragmentation and easier fluidization. The results set forth in the table also show that there is little benefit in increasing the ratio of magnets to nanoparticles above 1:1. It is also noted that the minimum fluidization velocities for low mass ratios of magnets to nanoagglomerates are actually higher than were observed for the nanoagglomerates without any magnetic assistance. This behavior is probably due to the additional drag of the gas on the magnetic particles.

The table of FIG. 16 presents the values of $U_{mf}$ and bed expansion ratio at a fixed superficial gas velocity for three different magnetic field intensities when fluidizing soft nanoagglomerates, keeping the ratio of magnets to nanoparticles at 2:1. The center point of the column around which the 2 coils are placed was selected as the reference point for measuring the intensity of the magnetic field and it was observed that, when using a magnetic field intensity of less than 80 G, the bed could not be fluidized. Hence, three (3) different intensities (100, 120, and 140 G) were selected to conduct the fluidization experiments. As shown in FIG. 16, the minimum fluidization velocity is a strong function of the magnetic field intensity and $U_{mf}$ and decreases rapidly as the intensity of the magnetic field increases, indicating better fluidization. The values of the bed expansion are quite close to one another, but they are nonetheless consistent with the trend that the bed will expand more in a stronger magnetic field.

The table of FIG. 17 presents the values of $U_{mf}$ and bed expansion ratio at a fixed superficial gas velocity for three (3) different frequencies of AC power, keeping the mass ratio of magnets to nanoparticles at 2:1 and the magnetic field intensity at 120 G at the center of the field. The table shows that the frequency of the magnetic field can significantly affect the minimum fluidization velocity. At the lower frequencies, i.e., 45 Hz and 60 Hz, the beds show similar fluidization behavior, and can be fluidized easily at a $U_{mf}$ of 0.65 cm/s and 0.51 cm/s, respectively. But at higher frequency, i.e., 80 Hz, the bed is difficult to fluidize, $U_{mf}$ is as high as 2.64 cm/s, and the bed expansion is much smaller than at the lower frequencies. At a frequency higher than 90 Hz, the bed could not be fluidized at all.

This foregoing experimental studies have shown that silica nanoparticle agglomerates can be easily and smoothly fluidized with the assistance of magnetic particles in an oscillating magnetic field. Due to a significant reduction in the minimum fluidization velocity with magnetic assistance, both elutriation of nanoparticle agglomerates and gas bypass in the form of bubbles is greatly reduced. With magnetic excitation, hard (larger than 500 µm) agglomerates change their fluidization pattern from no fluidization to agglomerate particulate fluidization (APF) with large bed expansion. The minimum fluidization velocity of an 80% soft (smaller than 500 µm) and 20% hard agglomerate (80/20) mixture can also be significantly reduced. Magnetic-assisted nanoparticles fluidization is easier to achieve and yields more uniform fluidization, and such approach can be used for "as-received powders", i.e., straight out of the bag, without any pre-processing, and hence is very useful for practical applications. Overall, the introduction of the magnetic energy according to the present disclosure significantly alters agglomerate size, reducing it to achieve a desired size distribution, and allowing for advantageous fluidization performance results.

The fluidization of nanoparticles and/or nanoagglomerates in accordance with one or more aspects of the present invention may have a great impact on the processing and manufacturing of nanostructured products. It is known that mechanical, electronic, catalytic, optical, and/or other properties of a material are significantly enhanced when made of nanoparticle components. For example, copper preferably composed of nanocrystalline copper may be 5 times harder than copper that is composed of micron-sized copper particles. Further, the mixing of nanosized aluminum and molybdenum oxide to produce MIC, an energetic material that may have a variety of important military applications. It has been ascertained that good mixing of the two components on the nanoscale, as provided by the present invention, is essential for obtaining a viable, highly energetic product.

There are also several coating applications for nanoparticles/nanoagglomerates which may be imminent with the present invention. For example, in an alternative aspect of the present invention, the apparatus of the present invention may be provided with a spray nozzle preferably located above the bed surface. The spray nozzle is preferably suitable to spray the surface, where the particles are continuously circulating throughout the bed. The spray nozzle may preferably be sized to deliver an appropriate amount of material for a desired amount of coating. Due to the loose structure of the agglomerates, individual coating of primary particles may only be forthcoming.

2. Sound-Assisted Fluidization of Nanoparticle Agglomerates

According to the present disclosure, it has been found that, with the aid of sound wave excitation at low frequencies, a bed of nanoparticle agglomerates can be readily fluidized and the minimum fluidization velocity is significantly reduced. For example, in the case of an exemplary nanoparticle material, namely hydrophobic fumed silica nanoparticles (Degussa Aerosil® R974 having a primary particle size of 12 µm) in the form of large 100 to 400 µm agglomerates, the minimum fluidization velocity was decreased from 0.14 cm/s in the absence of sound excitation to 0.054 cm/s with the assistance of sound wave excitation. In addition, under the influence of sound, channeling or slugging of the bed quickly disappeared and the bed expanded uniformly. Within a certain range of the sound frequency, typically from 200 to 600 Hz, bubbling fluidization occurred. Both the bed expansion and bubble characteristics have been determined to be strongly dependent on the sound frequency and sound pressure level. However sound has almost no impact on fluidization when sound frequency is extremely high, e.g., above 2000 Hz. A relatively high sound pressure level (such as 115 dB) is needed to initiate the fluidization at such high frequencies.

Thus, according to the present disclosure, sound waves are advantageously employed for fluidization purposes, either alone or in combination with other external energy sources, to provide excitation to nanoparticles that is relatively inexpensive, affects the entire particle bed, and does not require any physical contact between the sound generator and the nanoparticles. The advantageously disclosed sound-assisted fluidization of nanoparticle agglomerates and their fluidization characteristics are not only different from those observed using other fluidization methods for nanoparticle agglomerates, but are also different from sound-assisted fluidization of micron or sub-micron sized particles. The effects of sound frequency and sound pressure level on the fluidization behavior, such as the minimum fluidization velocity, bubbling regime, pressure drop across the bed, and bed expansion, are also disclosed herein.

Figure 18:
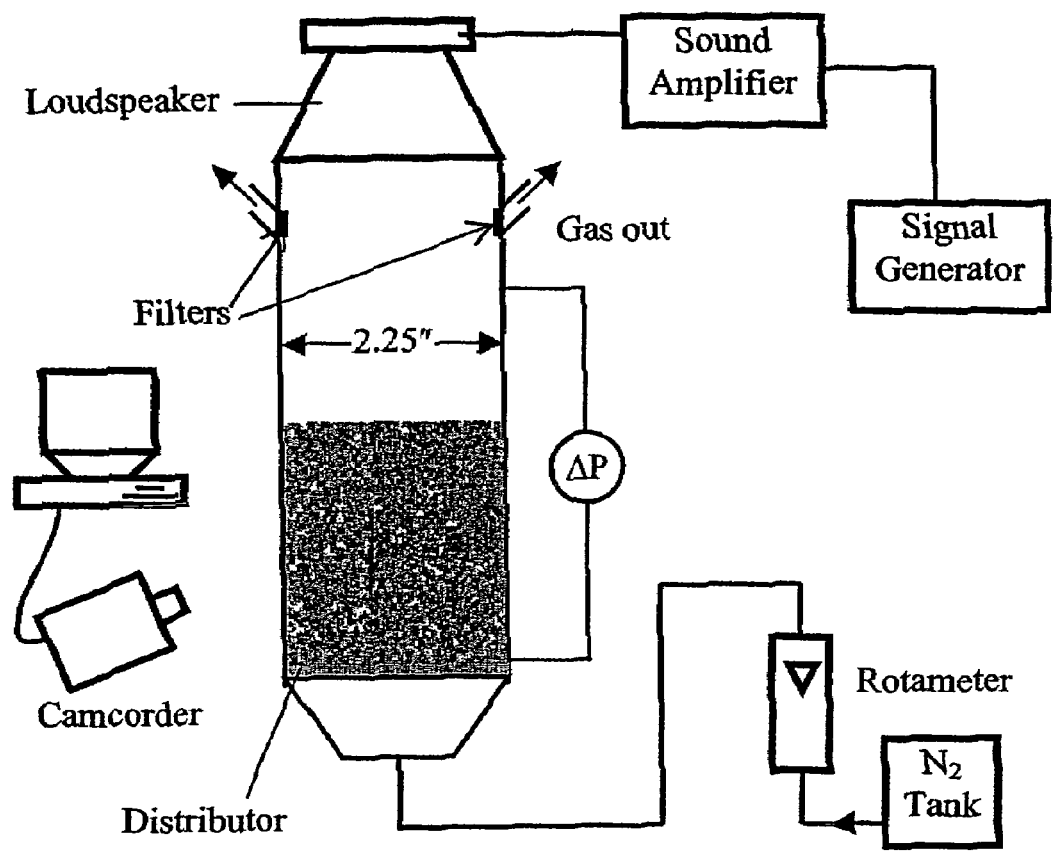
FIG. 18 provides a schematic diagram of an exemplary sound-assisted fluidization system according to the present disclosure.

A schematic diagram of an exemplary sound-assisted fluidization system 100 is shown in FIG. 18. The exemplary system 100 includes a fluidized bed 102 containing nanoparticle agglomerates 104, a sound excitation device 106, and a visualization apparatus 108. The visualization apparatus 108 is provided for the sole purpose of monitoring the activities and/or behavior of the nanoparticles within fluidized bed 102, and is not required for implementations wherein such monitoring is not necessary or desirable. The exemplary fluidized bed 102 is a vertical transparent column with a distributor 110 at the bottom. In an exemplary embodiment of the present disclosure, the column is fabricated from a section of acrylic pipe with an inner diameter of 57 mm and a height of 910 mm. The exemplary distributor 110 is a sintered metal plate of stainless steel with a thickness of 2 mm and pore size of 20 µm. Ultra-fine mesh filters 112 are located at the gas outlet to filter out any elutriated nanoparticle agglomerates.

The disclosed sound excitation device 106 includes a 63 mm loudspeaker 114 that is powered by a sound amplifier 116 that communicates with a signal generator 118. The loudspeaker 114 is installed on the top of fluidized bed 102. A precision sound pressure level meter (not pictured) may be used to measure the sound pressure level. According to an exemplary embodiment of the present disclosure, sound excitation system 106 is capable of generating a sound wave in fluidized bed 102 with a sound pressure level up to 125 dB and the sound frequency from signal generator 118 is typically adjustable, e.g., within a range extending from 10 to 2 MHz. The fluidization behavior of the nanoparticles is visualized with the aid of a lighting device (not pictured) and is recorded by a digital camcorder 120. The visual images may be advantageously analyzed directly by a computer 122.

According to an experimental use of the system 100, synthetic silicon dioxide nanoparticles (Degussa, R974) with a primary particle diameter of 12 nm and a primary density of 2560 kg/m³ were employed. The disclosed sound-assisted fluidization system is not limited to use with silicon dioxide nanoparticles, however, but may be employed with a variety of nanoparticle materials finding application in a variety of commercial fields. Before use in exemplary system 100, the nanoparticles were sieved using a shaker (Octagon 2000) and a sieve of Mesh No. 35 (mesh opening, about 500 µm). The sieving process served to remove very large agglomerates which may have been generated during packing, storage, and transportation. The selection of a mesh opening of 500 µm reflects the fact that the typical size of fluidized nanoparticle agglomerates is between 100 to 400 µm (although the present disclosure is not limited to such particle size distributions). The bulk density of the sieved nanoparticle agglomerates was 33.8 kg/m³.

Due to surface treatment by the manufacturer, the silicon dioxide nanoparticles are hydrophobic. To minimize any potential effect of humidity on the nanoparticle fluidization, pure nitrogen from a compressed $N_2$ tank 122 was used as the fluidizing gas. The gas flow rate was measured and adjusted by a calibrated rotameter 124. With the aid of an inclined tube monometer 126, the pressure drop across the bed was measured. By measuring the pressure in the manner schematically depicted in FIG. 18, the pressure drop across distributor 110 was excluded.

Typical bed behavior of $SiO_2$ nanoparticle agglomerates with and without sound excitation are shown in FIGS. 19(a) and 19(b), respectively. The nanoparticle agglomerates were first lifted in a slugging mode and then the bed disintegrated to form stable channels. The bed only expands slightly with an uneven surface, as shown in FIG. 19(a). Once a sufficiently strong sound is applied, the instabilities in the bed collapse in a couple of seconds, the channels disappear, and the bed expands rapidly and uniformly until it reaches the full expansion. A homogenous fluidization state is easily established, as shown in FIG. 19(b).

Figure 21:
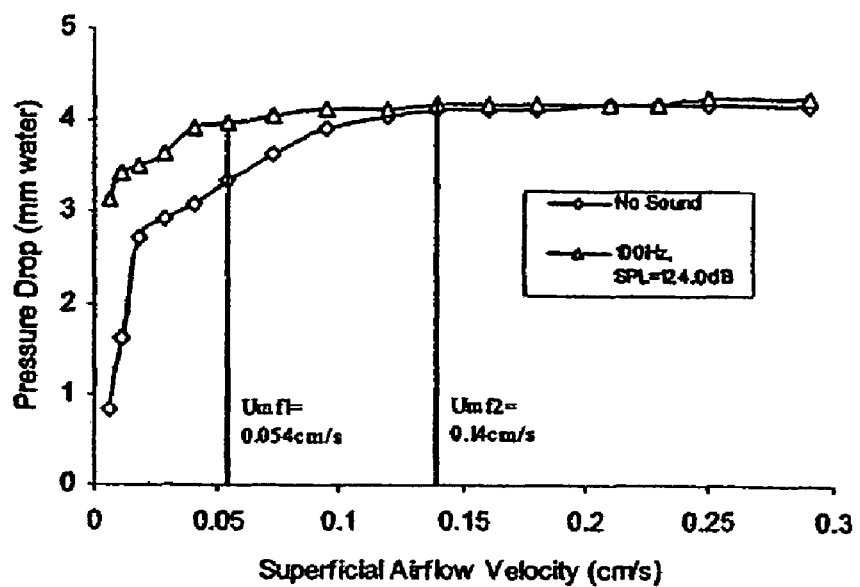
FIG. 21 provides a plot of pressure drop relative to superficial air velocity, with and without sound excitation, according to an exemplary embodiment of the present disclosure.

Typical fluidization characteristics, including the minimum fluidization velocities, bed expansions and bed pressure drops with and without sound excitation, are illustrated in FIGS. 20 and 21, respectively. An advantageous substantial reduction in the minimum fluidization velocity with the introduction of the disclosed sound energy is apparent. For the test material, i.e., the DeGussa Aerosil® R974 nanoparticles, the minimum fluidization velocity was reduced from 0.14 cm/s in the absence of sound energy to 0.054 cm/s with sound excitation. As used herein, the minimum fluidization velocity is defined as the gas superficial velocity beyond which the bed pressure drop is no longer dependent upon the gas velocity and becomes nearly constant.

As noted above, at low gas velocities, only the slugging and channeling occur in a fluidized bed of nanoparticle agglomerates while, at sufficiently high gas velocities, the bed can be fluidized smoothly. Fluidization of nanoparticle agglomerates occurs due to the effective breakup of large agglomerate clusters by the large hydrodynamic forces at high gas velocities. With the aid of sound excitation, however, the breakup of large agglomerate clusters takes place due to a combined effect of hydrodynamic forces and acoustic excitations. Through the introduction of such energy, the particle size distribution is advantageously shifted downward, thereby facilitating efficient and efficacious fluidization according to the present disclosure.

Figure 22:
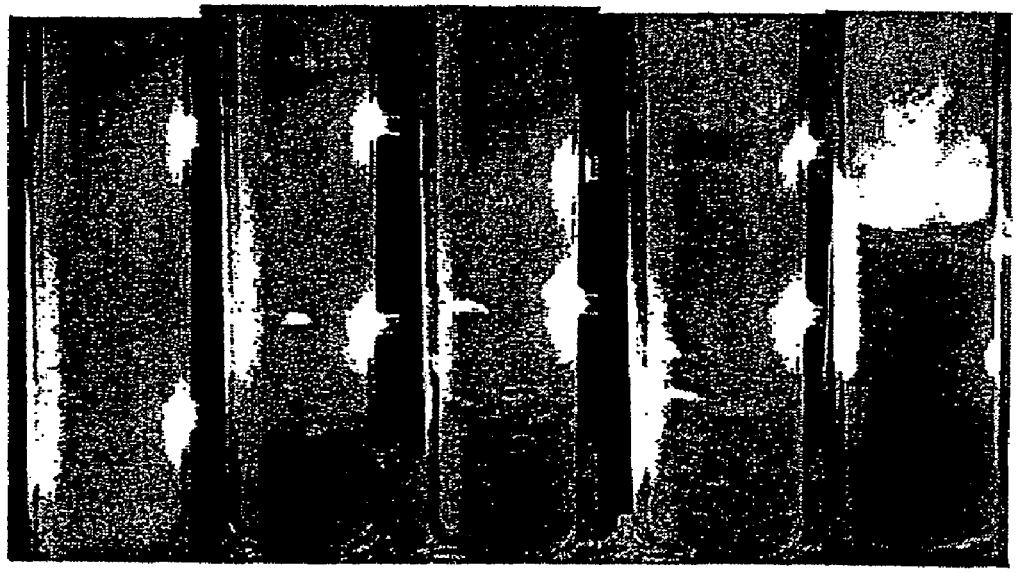
FIG. 22 provides images of fluidization behavior at different sound frequencies (300, 400, 500, 600 and 1000 Hz) according to an exemplary embodiment of the present disclosure.
Figure 23:
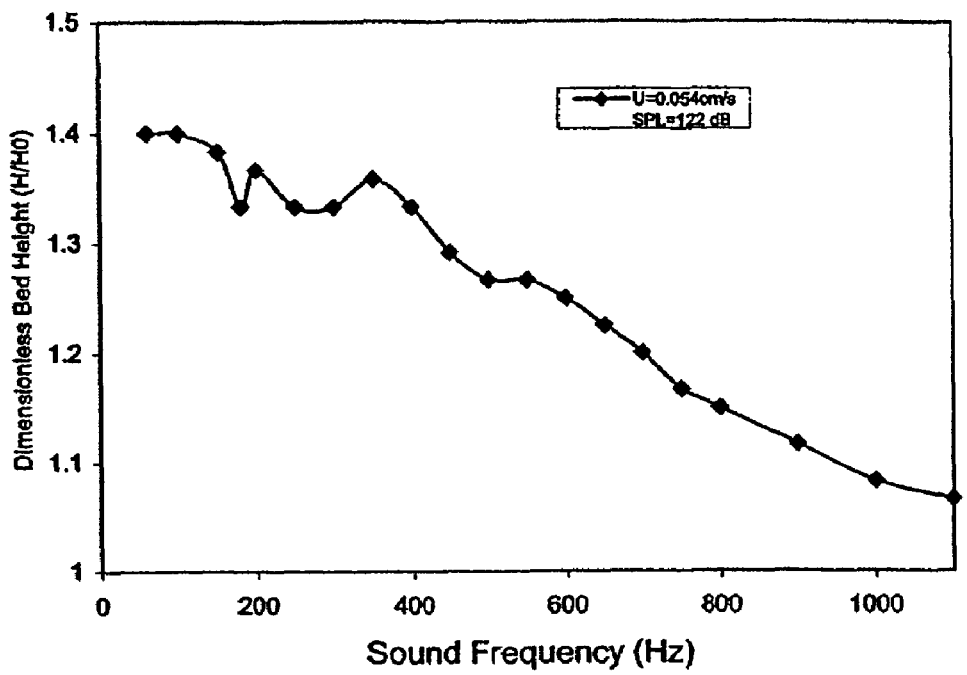
FIG. 23 provides a plot of dimensional bed height relative to sound frequency according to an exemplary embodiment of the present disclosure.

FIG. 22 shows a series of representative snapshots of the fluidizing bed at different sound frequencies. At a fixed sound level output (e.g., 125 dB in FIG. 22), the bed of nanoparticle agglomerates can only be fluidized in a relatively narrow band of low sound frequency from 20 to 1000 Hz. Furthermore, bubbles appear in an even narrower range, 200-600 Hz, and as seen in FIG. 22, both the occurrence of bubbling and bubble size are strongly dependent on the sound frequency. Due to the relatively high bed voidage observed when fluidizing nanoparticle agglomerates in the bubbling fluidization regime, the bubble size and the bubble rising velocity can be easily identified using visualization technology. The bed expansion is also strongly dependent on the sound frequency, as seen in FIG. 23.

Figure 24:
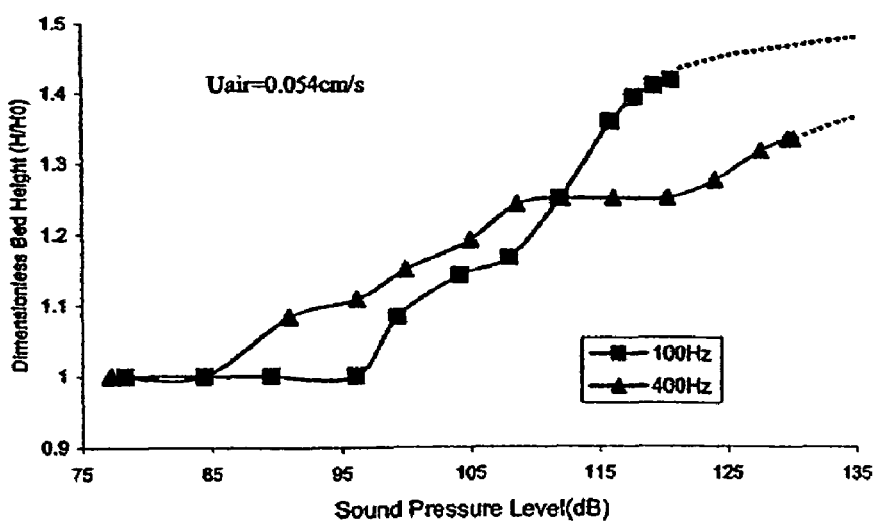
FIG. 24 provides a plot of dimensional bed height relative to sound pressure level (dB) at two sound frequencies (100 and 400 Hz) according to an exemplary embodiment of the present disclosure.

The effect of sound pressure level on the bed expansion is shown in FIG. 24. It is noted that below a critical value of sound pressure level (e.g., 112 dB at 100 Hz and 105 dB at 400

Hz in FIG. 24), there is no fluidization. The critical sound pressure level appears to be a function of sound frequency. Within the range of the test conditions reflected in FIG. 24, the bed expansion increases monotonically as the sound pressure level increases.

Bed expansion and overall fluidization performance according to this exemplary embodiment of the present disclosure are related, at least in part, to the balance between the sound-assisted agglomerate breakup and the sound-assisted agglomeration of the nanoparticles. The introduction of sound energy reduces agglomerate size and, once a desired agglomerate size distribution, advantageous fluidization performance results. At low frequencies, the introduction of sound energy to a nanoparticle system contributes to a reduction in particle size distribution, thereby enhancing bed expansion and fluidization (e.g., up to frequencies of about 1000 Hz), as well as reductions in minimum fluidization velocities (e.g., R974 reduced from 0.2 cm/s to 0.05 cm/s; $TiO_2$ reduced from 5.17 cm/s to 2.29 cm/s). In addition, at sound pressure levels of greater than about 90 dB, fluidization behavior of nanoparticle systems is enhanced. The enhanced fluidization behavior achieved through sound energy introduction supports or facilitates more uniform mixing, faster surface reaction and/or better surface coating.

Based on the test results set forth herein, it is apparent that nanoparticle agglomerates can be easily and smoothly fluidized with the assistance of sound energy at an appropriate sound pressure level and sound frequency. Since there is a significant reduction in the minimum fluidization velocity in the presence of sound, elutriation of nanoparticle agglomerates is much reduced. The ability to fluidize the exemplary fumed silica nanoparticle agglomerates could only be achieved within a given range of sound frequency with a sound pressure level above a critical value. Bubbling fluidization occurs within an even smaller range of sound frequency.

3. Fluidization of Nanoparticles and/or Nanoagglomerates in a Rotating Fluidized Bed According to a further aspect of the present disclosure, a rotating fluidizing bed (RFB) system and associated method/process are provided for use in advantageously fluidizing nanoparticles/nanopowders/nanoagglomerates. Use of the disclosed rotating fluidized bed system demonstrates a linear dependence between the minimum fluidization velocity and the centrifugal force delivered thereby. The centrifugal force is generally dependent on such factors as the dimensions of the rotating system and the rotational speed thereof. For example, conditions may be selected whereby the rotating system generates various force levels, e.g., forces that are 10, 20, 30 and 40 times normal gravity force. Of note, it has been determined that one disadvantage associated with fluidization of nanoparticles at normal gravity force is that high powder elutriation takes place at high gas velocities; however, using a centrifugal force field, higher gas flow rates may be advantageously employed without having such high levels of elutriation, while generating even smaller agglomerates sizes than in conventional fluidization.

Several factors can influence pressure drop across a rotating bed containing powders, such as elutriation, radial velocity, and overall unit design. It is further believed according to the present disclosure that Coriolis forces and their effects should be considered as an additional cause of pressure drop variations for rotating fluidized bed systems. Indeed, it has previously been mentioned that rotation is an additional factor for destabilization [Brouwers, *Phase separation in centrifugal fields with emphasis on the rotational particle separator*, Experimental Thermal and Fluid Science 26 (2002) 325-334], and that rotation becomes important when the Reynolds number based on rotation is higher than a certain value; secondary flows may also occur as a consequence of the Coriolis force.

With reference to FIGS. 25(*a*) and 25(*b*), an exemplary rotating unit 200 according to the present disclosure is schematically depicted. Rotating unit 200 includes a chamber 202 that encloses a cylindrical porous stainless steel sintered mesh 204 with an aperture size of 20 μm, 2 mm of thickness, 400 mm of diameter and 100 mm of depth. Mesh 204 functions to distribute the gas that passes through the bed, i.e., as a gas distributor. This gas distributor turns along its axis of symmetry, moved by a motor 206 which is controlled by a speed variator.

Rotating unit 200 also includes a stationary cylindrical filter 208 of 100 μm mesh with 2 mm of thickness, 100 mm of diameter and 90 mm of depth; the function of stationary filter 208 is to retain elutriated fine powder. The covers of chamber 202 and mesh/gas distributor 204 are typically fabricated of an appropriately rigid material, e.g., acrylic plastic. In an exemplary material, the covers are fabricated from a transparent or translucent material which allows the behavior of the bed inside the unit to be viewed.

Pressure taps 210 are placed between gas distributor 204 and the inner filter mesh 208, as shown in FIGS. 25(*a*) and 25(*b*). The pressure drop across the air distributor may be measured using a differential pressure transmitter. The gas, e.g., air, delivered to the distributor may be measured by an area variable type flowmeter 212. Since it is generally not possible to measure the bed pressure drop directly in a rotating fluidized bed, the pressure drop across the air distributor mesh 204 may be determined as a function of air velocity or flow rate before loading rotating unit 200 with powder. Then the bed pressure drop can be quantified by subtracting the pressure drop measured when the unit is loaded with powder, and when the unit is empty.

Among other accessories, a digital camera may be associated with rotating unit 200 for use in recording the behavior of nanoparticle agglomerates during fluidization. In addition, a laser light may be used to determine the expansion of the bed as well as the homogeneity of the bed's surface. Further, a vacuum system may be employed to remove exhaust from rotating unit 200 and the pressure transmitter may be advantageously connected to a computer system for processing of data received therefrom.

Experiments have been conducted using a system that corresponds to the system schematically depicted in FIGS. 25(*a*) and 25(*b*). The powders employed in such experimental runs belonged to Geldart C classification since they are very fine and cohesive particles; however, some of them behave like group "A" powders, specifically the APF behavior [Wang et al., *Fluidization and agglomerate structure of $SiO_2$ nanoparticles*, Powder Technology, 124 (2002) 152-159], while others have bubbling fluidization, specifically, the ABF behavior as found in recent experiments by our group, described later in this document. The tested powders showed a strong cohesive behavior, but they were quite different than C powders due to their fluidization behavior and bulk density. For purposes of the noted experiments, the powders were sieved using a shaker and a sieve of Mesh No. 60 (mesh opening about 250 μm). This sieving procedure was followed because it is believed that the large agglomerates break the homogeneity of the flow field and make the fluidization more difficult. Fumed Silica Aerosil was employed having an approximate tapped density of 50 g/l. The R974 material had an average particle size of 12 nm, while the R972 material had an average particle size of 16 nm. In both cases, 70 grams were used; the bulk density of these powders was approximately 30 g/l. The tested titanium dioxide P25 material had an average particle size of 21 nm, a tapped density of 130 g/l, and a bulk density of about 90 g/l. A total of 250 grams were used in the experiments and the initial bed height was close to 0.02 m.

The experimental steps can be summarized as follows. The unit was cleaned very carefully so as to ensure a uniform air field would be generated by the air distributor. All of the component parts of the rotating unit were assembled and all joints sealed in order to prevent leaks. The presence of leaks would undesirably distort collected pressure drop data. The pressure drop across the air distributor was then measured. For this purpose, the unit was run empty, and the air flow and the rotating speed were changed successively in order to find the relationship between the distributor's pressure drop and the air flow.

Next, the test material was loaded into the unit and the rotating speed was set at the desired value in order to increase the centrifugal force. Immediately thereafter, the air flow was increased slowly and relevant data was recorded, i.e., air flow, pressure drop and bed height. Subsequently, the rotating speed was increased to higher values and the same procedures were followed with respect to data collection.

FIG. 26 shows the measured air pressure drops at different values of air velocity and at different rotating speeds translated in "G"s (i.e., translated into gravity forces). The pressure drop increases until the minimum fluidization velocity is reached, then a constant pressure drop is observed. It is noted that the pressure drop does not uniformly maintain a linear trend before reaching the minimum fluidization velocity ($U_{mf}$); it is believed that due to the centrifugal force imparted by the rotating unit, the powder was compacted and therefore the changing pressure is due to the irregularities of the bed before reaching the fluidized state.

Figure 27:
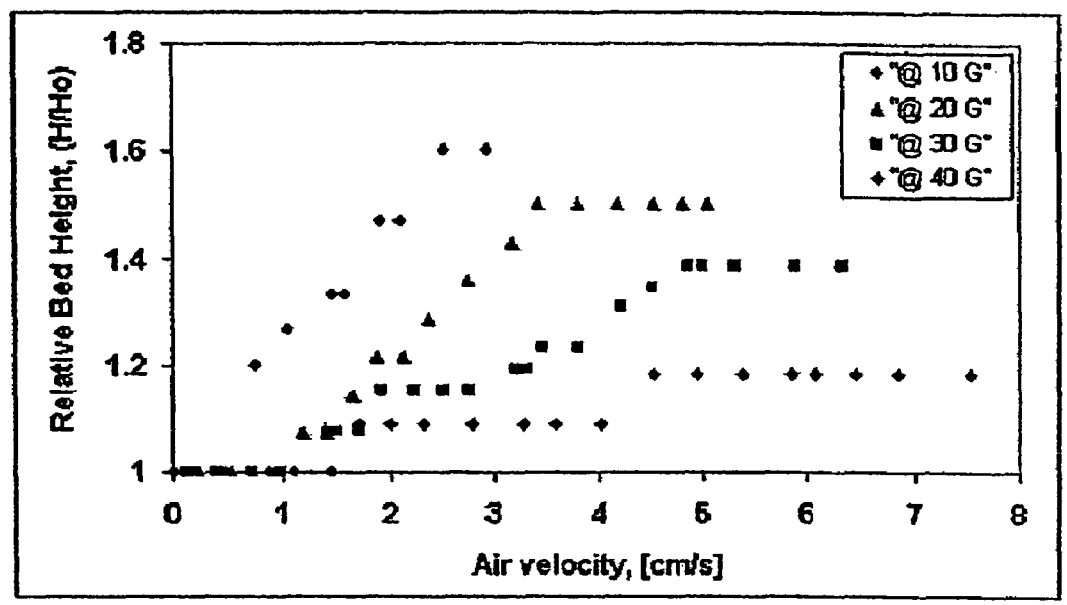
FIG. 27 provides a plot of bed height relative to air velocity for four (4) exemplary rotation speeds according to an exemplary embodiment of the present disclosure.
Figure 28:
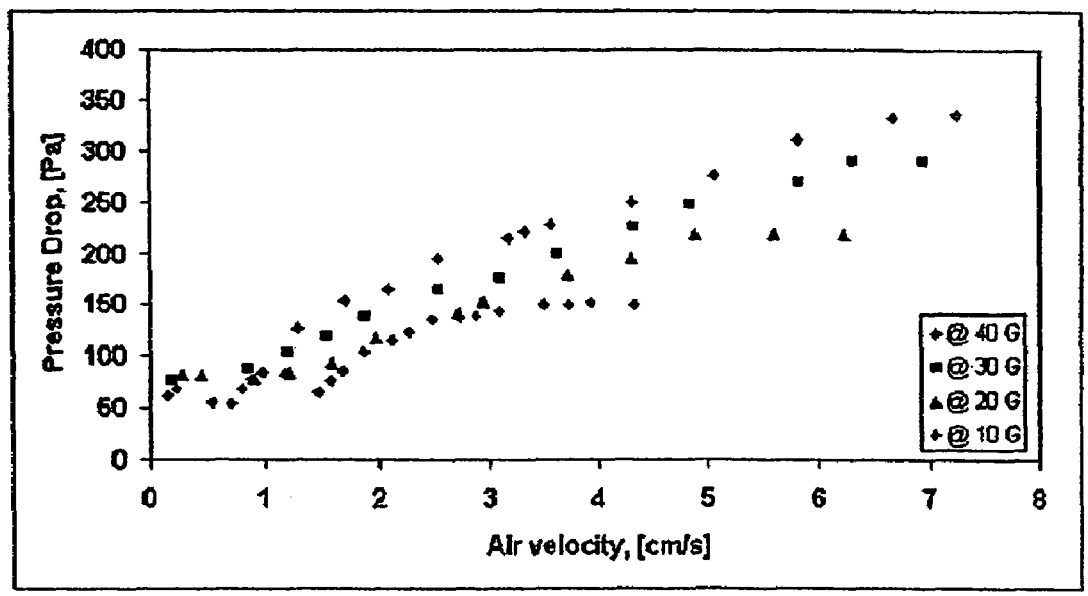
FIG. 28 provides a plot of pressure drop relative to air velocity for four (4) exemplary rotation speeds according to an exemplary embodiment of the present disclosure.
Figure 29:
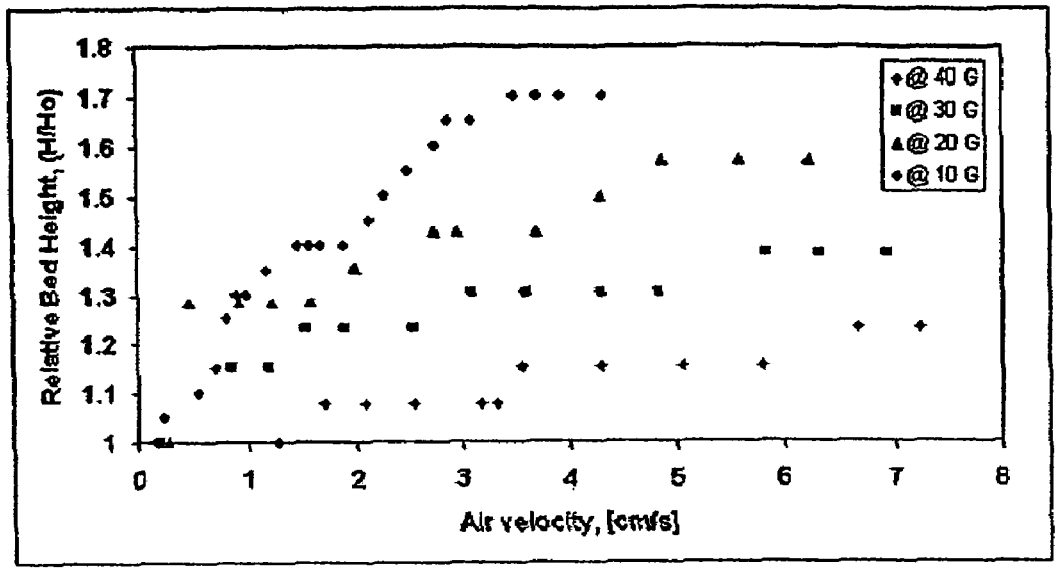
FIG. 29 provides a further plot of bed height relative to air velocity for four (4) exemplary rotation speeds according to an exemplary embodiment of the present disclosure.

FIG. 27 shows the relative bed height as a function of air velocity for the tested R974 material. It is noted that the compaction effect over the bed that is effected by the centrifugal field changes the bulk density of the powder. Bed pressure drop data related to the fluidization behavior of R972 material is shown in FIG. 28. FIG. 29 shows the relative bed height during fluidization of the R972 material. In the case of R972 material (as with the R974 material), there is a compaction effect over the powder as the centrifugal field increases. It is believed that the centrifugal force is transmitted to all particles in the bed by the particles that are in closer proximity to the air distributor.

Figure 30:
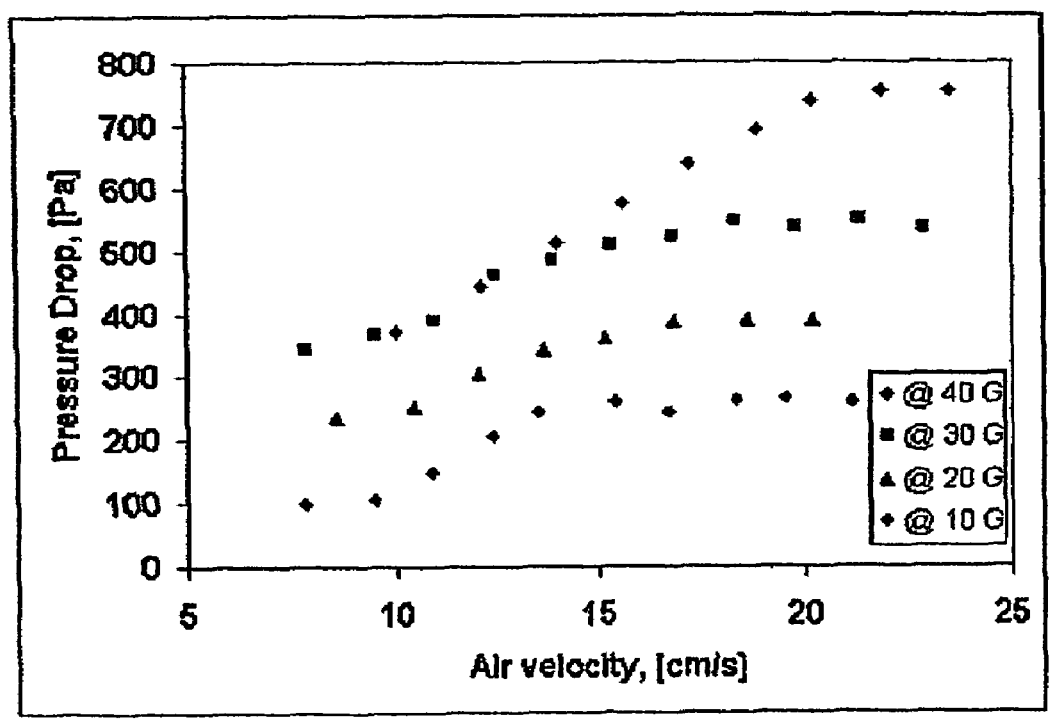
FIG. 30 provides a further plot of pressure drop relative to air velocity for four (4) exemplary rotation speeds according to an exemplary embodiment of the present disclosure.
Figure 31:
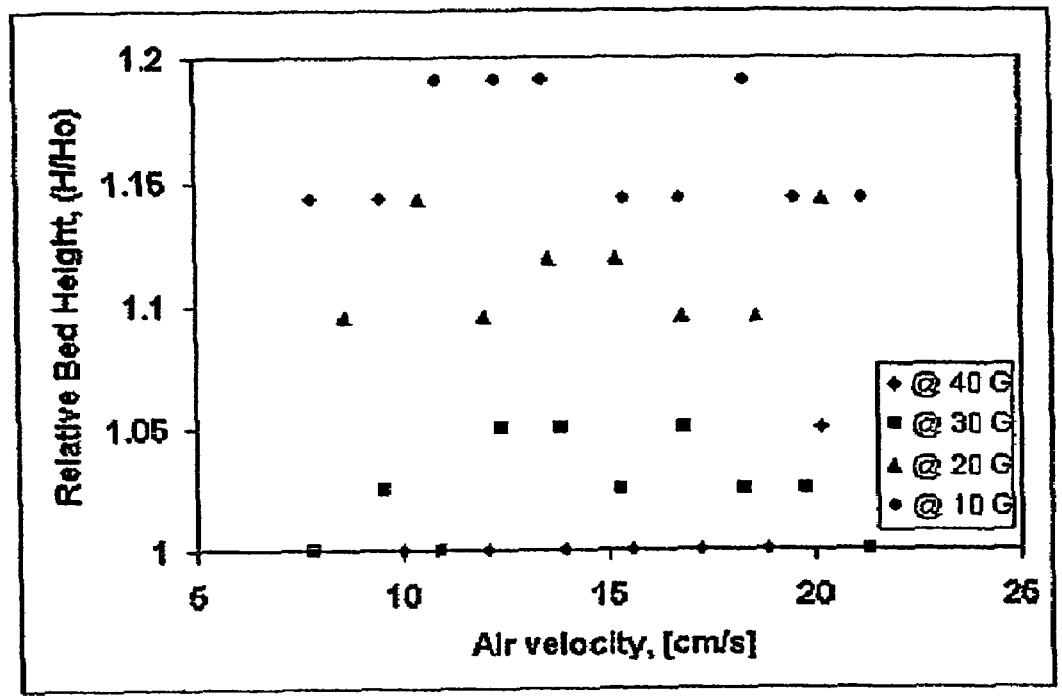
FIG. 31 provides an additional plot of bed height relative to air velocity for four (4) exemplary rotation speeds according to an exemplary embodiment of the present disclosure.

FIG. 30 shows the fluidization behavior for titanium dioxide P 25 material. Of note, the amount of titanium dioxide loaded into the unit for the experimental runs described herein was higher than the amount of fumed silica because the bulk density of the titanium dioxide is approximately three (3) times that of the silica; therefore, a larger pressure drop was expected due to the increase of the weight of the bed within the system. With reference to bed height response for the titanium dioxide material and as shown in FIG. 31, there is not a large bed expansion as was experienced with the R974 and R972 silica powder materials. In addition, measurement of the increase in bed height was very difficult to achieve. This difficulty can be explained due to the higher density (bulk and particle) of the titanium dioxide powder. No significant elutriation was observed during the titanium dioxide experimental runs.

Therefore, it can be concluded that fluidization behavior in the rotating bed systems of the present disclosure differs based, at least in part, on the characteristics of the particles processed in such systems. For the R974 and R972 fumed silica materials, the bed expansion behavior can facilitate determination of the fully fluidized system state. By contrast, for the $TiO_2$ P25 material, the bed expansion was poor and unstable, thereby giving no useful insight with respect to the fluidization state of the system.

Figure 32:
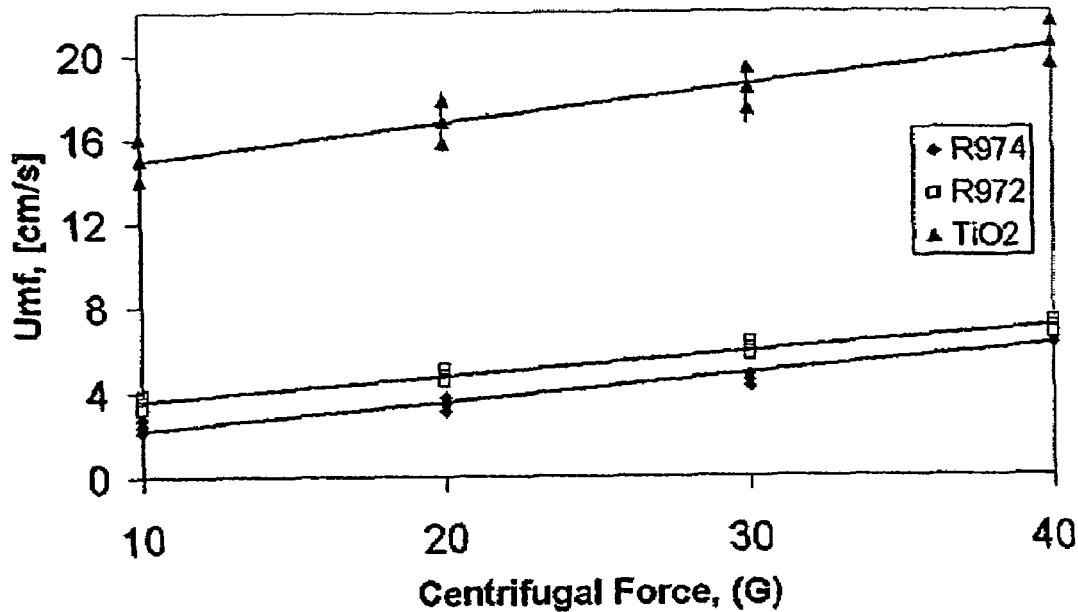
FIG. 32 provides a plot of fluidization velocity relative to centrifugal force for three exemplary powder systems according to the present disclosure.

FIG. 32 shows the relationship between minimum fluidization velocity and centrifugal force for the three tested material systems. A linear dependence between the minimum fluidization velocity and centrifugal force, as observed in prior studies and consistent with a model proposed by Kao et al. [Kao et al., *On Partial Fluidization in Rotating Fluidized Beds, AIChE J.* 33 (1987) 858].

The experimental pressure drop measurements can be affected by several problems during the experimental runs described herein, such as clogging of the distributor, leaks across the distributor assembly, inaccuracies in the readings of the flow rate, problems in the pressure reading system, etc. However, these systematic errors generally exhibit a level of repeatability that can be determined and, therefore, actions can be taken to address the underlying problem(s). Preliminary analysis shows that the theoretical predictions for the pressure drop in a rotating fluidized bed only consider the effect due to the centrifugal forces, and do not account for the effects of the relative magnitude between the radial and tangential velocities and the gradient of the tangential velocity in the radial direction. Nanoparticles differ in this respect from micron and larger particles, because the radial air velocities for nanoparticles are much lower than those for the micron and larger sized particles. When such factors are all taken into account, one may find that the current theoretical predictions such as Kao et al. [Kao et al., *On Partial Fluidization in Rotating Fluidized Beds, AIChE J.* 33 (1987) 858], may not be fully valid and may need to be corrected for other effects, including but not limited to the Coriolis effects.

Based on the foregoing experimental data, the advantageous ability to fluidize nanoparticles, nanopowders and/or nanoagglomerates in a rotating fluidized bed according to the present disclosure is clearly demonstrated. The foregoing experimental data also shows that different nanopowders exhibit different behaviors during fluidization in a rotating bed. The advantages of the disclosed rotating fluidized bed relative to conventional, non-fluidized systems include: less elutriation of powder, higher air flow rate, higher powder load by unit area of distributor, reduction of the size of agglomerates due to the higher shear rate, and shorter processing time. The foregoing test results further demonstrate a linear dependency of the minimum fluidization velocity and the artificial gravity force generated by the centrifugal effect. In addition, it is believed that when fluidizing agglomerates of nanoparticles, effects such as the Coriolis forces and others affect the pressure drop.

4. Gas Fluidization Characteristics of Nanoparticle Agglomerates

According to a further aspect of the present disclosure, the effects of different types of nanoparticles on gas fluidization characteristics of nanoparticle agglomerates was determined. Taking advantage of the extremely high porosity of the bed, optical techniques were used to visualize the flow behavior, as well as to measure the sizes of the fluidized nanoparticle agglomerates at the bed surface. Upon fluidizing a series of different nanoparticle materials, two types of nanoparticle fluidization behavior were observed, namely agglomerate particulate fluidization (APF) and agglomerate bubbling fluidization (ABF).

Highly porous nanoparticle agglomerates exhibit two distinct fluidization behaviors, APF (smooth fluidization without bubbles at minimum fluidization) and ABF (bubbles at minimum fluidization). APF agglomerates show very large bed expansions, up to five times the initial bed height as the superficial gas velocity is raised, and the Reynolds numbers for these nanoagglomerates at minimum fluidization are very low (0.05 to 0.35), which indicate that the agglomerates are in creeping flow. ABF nanoagglomerates fluidize with large bubbles and show very little bed expansion as the superficial gas velocity is raised and the Reynolds numbers at minimum fluidization are close to or higher than 2.0, which indicate that hydrodynamic inertial effects cannot be neglected.

The difference in fluidization behavior between smooth, liquid like, bubble-less, particulate fluidization with high bed expansion (APF), and non-homogeneous, bubbling, aggregative fluidization with low bed expansion (ABF) has been found according to the present disclosure to largely depend on the bulk density and the primary particle size of such nanoparticles. Indeed, the fluidization of relatively small (less than 20 nm) nanoparticles with a bulk density less than 100 kg/m$^3$ appear to behave as APF, whereas larger and heavier nanoparticles are more likely to behave as ABF (see the Table included as FIG. 33 hereto).

On the basis of experimental data using classical fluidized particles such as FCC catalyst, UOP catalyst, and hollow resin, Romero and Johanson [Romero et al., *Factors affecting fluidized bed quality*, Chem. Eng. Progr. Symp. Series., 58 (38) (1958) 28-37] present a criterion to characterize the quality of fluidization as either smooth or bubbling, depending on the value of a combination of dimensionless groups. These dimensionless groups consist of the product ($\Pi$) of the particle to fluid density ratio, the Reynolds and Froude number (these are based on calculated agglomerated properties, and not on primary particle properties) at minimum fluidization, and the bed height to bed diameter ratio:

$$\Pi = Fr_{mf} Re_{mf} \frac{\rho_a - \rho_g}{\rho_g} \frac{H_{mf}}{d_t} < 100, \text{ smooth fluidization} \quad (1)$$

$$\Pi = Fr_{mf} Re_{mf} \frac{\rho_a - \rho_g}{\rho_g} \frac{H_{mf}}{d_t} > 100, \text{ bubbling fluidization}$$

wherein:
$d_t$ diameter of vessel (chamber), cm
$Fr_{mf}$ Froude number at minimum fluidization velocity, $$Fr_{mf} = \frac{u_{mf}^2}{d_a g},$$

dimensionless
$H_{mf}$ bed height at minimum fluidization velocity, cm
$Re_{mf}$ Reynolds number at minimum fluidization velocity, dimensionless
$\rho_a$ density of agglomerate in fluidized bed, kg/m$^3$
$\rho_g$ density of gas, kg/m$^3$ The porous nanoparticle agglomerates of the present disclosure behave differently than the classical solid particles used to obtain equation (1). Nonetheless, the values of the dimensionless groups (which are designated as "$\Pi$") were calculated for a series of tested nanoparticle materials. Unexpectedly and as shown in the Tables included as FIGS. 34 and 35 herein, the calculated results agree remarkably well with this criterion of formula (1). For the eight APF nanoparticle materials set forth in the Tables of FIGS. 34 and 35, the values of $\Pi$ are within the range of 0.008~1.55 (which is much less than 100), whereas for the three ABF nanoparticle materials, the values of $\Pi$ are within the range of 398~1441 (which is much larger than 100). Hence, the criteria set forth in formula (1) appear to be valid for nanoparticle agglomerates and therefore provide a valuable tool or methodology for determining whether a nanoparticle of interest will behave as APF or ABF.

Thus, according to the present disclosure, a classification criterion based on the value of a combination of dimensionless groups to differentiate between particulate and bubbling fluidization for classical solid fluidized particles may be advantageously employed to predict whether nanoparticles will behave as APF or ABF. Indeed, utilization of this criterion may be superior to using the size and bulk density of the nanoparticles to predict their fluidization behavior.

Moreover, it is demonstrated herein that fluidization of well-sieved nanopowders may be effectively achieved in the absence of external excitation, e.g., external excitations based on vibration, magnets, etc. Thus, according to the present disclosure and without external excitation, nanopowders may be fluidized provided the nanoparticles are well-sieved so that large, hard agglomerates are removed. This advantageous result further enhances the flexibility and effectiveness of nanoparticle fluidization systems according to the present disclosure.

5. Combined Systems

According to the present disclosure, it is specifically contemplated that one or more of the energy modalities disclosed herein may be advantageously employed either alone or in combination. Thus, for example, the following energy source combinations may be employed to achieve advantageous fluidization of nanoparticles according to the present disclosure:
Vibratory force in combination with magnetic force;
Vibratory force in combination with sound energy;
Vibratory force in combination with a rotating fluidized bed;
Vibratory force in combination with at least two of magnetic force, sound energy and a rotating fluidized bed;
Vibratory force in combination with magnetic force, sound energy and a rotating fluidized bed;
Magnetic force in combination with sound energy;
Magnetic force in combination with a rotating fluidized bed;
Magnetic force in combination with at least two of vibratory force, sound energy and a rotating fluidized bed;
Sound energy in combination with a rotating fluidized bed;
Sound energy in combination with at least two of vibratory force, magnetic force and a rotating fluidized bed; and
A rotating fluidized bed in combination with at least two of vibratory force, magnetic force and sound energy.

Thus, according to the present disclosure, systems and methods/processes for fluidization of nanoparticles are provided that exhibit numerous advantageous properties and results, including: less elutriation of powder, lower minimum fluidization velocities, in certain cases, higher air flow rate, higher powder load by unit area of distributor, reduction of the size of agglomerates due to the higher shear rate, improved mass-transfer and shorter processing time. Moreover, in exemplary implementations of the present disclosure wherein multiple energy sources are combined with a fluidizing gas source, e.g., combinations of at least two ancillary energy sources selected from among vibratory forces, magnetic forces, sound/acoustic forces, and rotational/centrifugal forces, the application of such external energy sources may be supplied at levels such that, in combination, the ancillary energy supplied to the fluidization system affects the desired nanoparticle fluidization results. The disclosed systems and methods/processes may also be employed with a variety of fluidizing gases, e.g., air, $N_2$, He, Ar, $O_2$ and/or combinations thereof. Thus, the ability to supply multiple types and levels of energy provides significant control and flexibility to the fluidization of nanoparticle systems. The advantageous fluidization systems and methods/processes disclosed herein may be used in processing a wide variety of nanoparticle materials for use in various applications, including applications that involve the manufacture of drugs, cosmetics, foods, plastics, catalysts, energetic and bio materials, high-strength or corrosion resistant materials, and in mechatronics and micro-electro-mechanical systems. Effective dispersion of nanoparticles is achieved according to the present disclosure, thereby facilitating a host of nanoparticle-related processing regimens, e.g., mixing, transporting, surface property modifications (e.g., coating), and/or downstream processing to form nano-composites.

The present disclosure having been thus described with particular reference to exemplary forms thereof, it will be readily apparent that various changes and modifications may be made therein without departing from the spirit of the present disclosure as defined herein. The following additional examples are intended for illustrative purposes only and should not be construed so as to limit or narrow the scope of the present invention in any way.

Example 1

An apparatus as shown in FIG. 2 was used to fluidize nanopowders using any gas such as air or nitrogen and vibration.

Figures 35, 36:
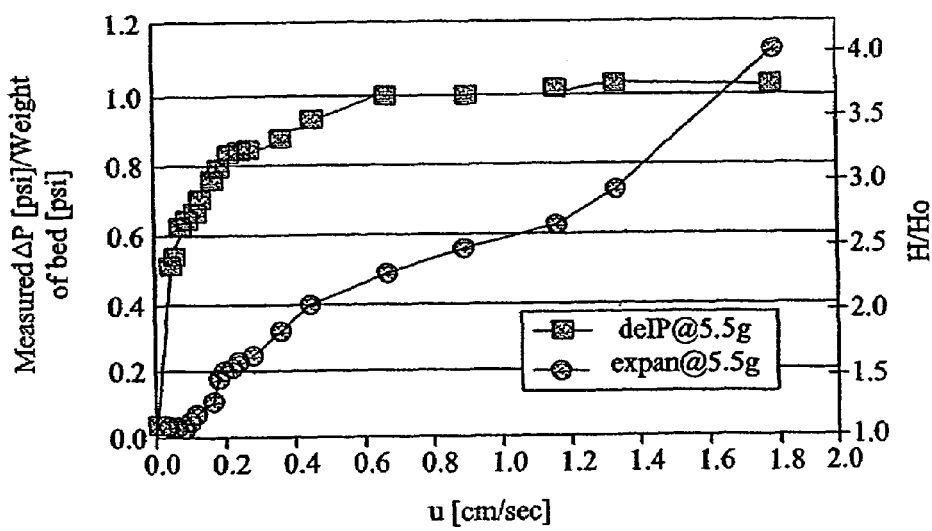
FIG. 35 provides fluidization characteristics of ABF nanoparticles in tabular form.
FIG. 36 is an exemplary graphical representation of pressure drop and bed expansion data as a function of velocity in accordance with an illustrative aspect of the present disclosure.

FIG. 36 shows an exemplary plot of observed pressure drop and bed expansion vs. superficial air velocity. At gas velocities greater than 0.1 cm/sec and a vertical sinusoidal vibration of 5.5 g's, the bed begins to expand and continues to expand both before and after the minimum fluidization velocity, defined as the velocity at which the pressure drop across the bed is equal to the weight of the bed divided by its cross sectional area. The bed expanded to four times its initial height and appeared to be uniformly fluidized with negligible elutriation.

Example 2

Using the apparatus of FIG. 2, and 12 nm silica powders with a constant flow rate and vibrational parameters of 50 Hz and 2 g's, the silica powders were fluidized.

Figure 37:
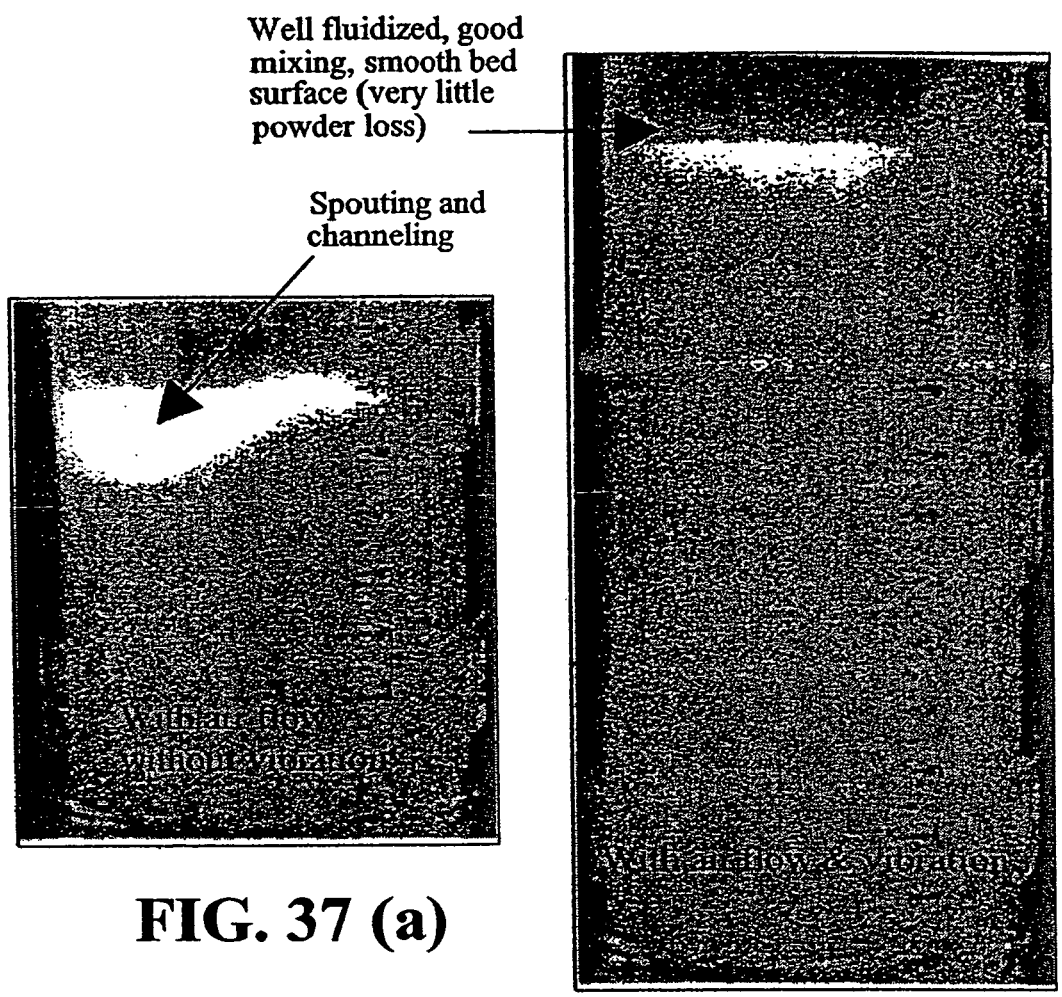
FIGS. 37(a) and 37(b) are exemplary photographs showing a fluidization bed with and without vibration, respectively, in accordance with an illustrative aspect of the present disclosure.

FIGS. 37(a) and 37(b) illustratively show what may typically occur during a fluidization process. With air or vibration alone, nothing useful occurs to a conventional nanoparticle powder bed. When the two are coupled together, however, the nanoparticle size distribution is reduced/lowered and the powder bed expands with vigorous particle movement.

Example 3

Using the apparatus of FIG. 2, and 12 nm silica, tracer silica dyed with methylene blue and constant flow rate of dry air and vibrational parameters of 50 Hz and 4 g's, was fluidized.

Figure 38:
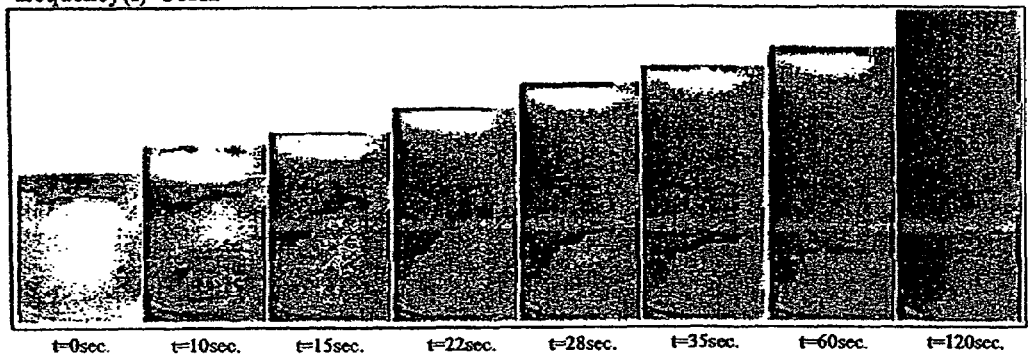
FIG. 38 provides a series of exemplary photographs showing a progression of mixing during aerated vibrofluidization in accordance with an illustrative aspect of the present disclosure.

FIG. 38 shows the progression of mixing 12 nm silica with a small amount of the same nano-sized silica dyed with methylene blue. The bed was operated at a constant air velocity of 0.45 cm/sec with a vertical sinusoidal vibration of 4 g's at a frequency of 50 Hz. As can be seen in the figure, as soon as the vibration was turned on the bed started to expand and uniform bubble less fluidization was observed. Within 2 minutes, the entire bed turned blue, indicating not only good fluidization, but also very good mixing.

Example 4

Using the apparatus of FIG. 2, and 12 nm silica, carbon black nanoparticles and constant flow rate of dry air and vibrational parameters of 50 Hz and 4 g's, the silica was fluidized.

Figure 39:
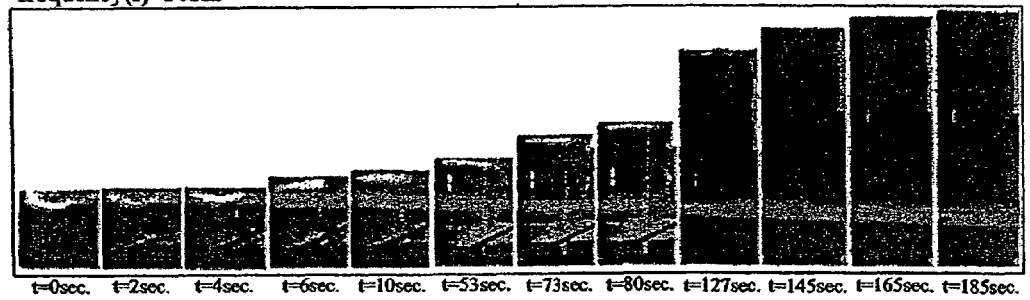
FIG. 39 provides a series of exemplary photographs showing a progression of mixing during magnetically assisted nanofluidization in accordance with an illustrative aspect of the present disclosure.

Similar results, depicted in FIG. 39, were obtained with magnetic assistance instead of vibration. In this particular example, the weight of the magnets, whose size range from 1.4 to 1.6 mm, was double that of the silica bed. A small amount of carbon black, another nanosized powder, was used as the tracer and placed on top of the silica bed at the start of the experiment. Again, within minutes, the entire bed showed very good and complete mixing.

Prophetic Example 1

Using the apparatus of FIG. 2 along with vibration and magnetic excitations, a coated nano-powder mixture of pigment and polymeric material may be fluidized for powder coating application. Metallic objects to be coated may be heated to temperatures above the melting temperature of the polymer and dipped in the fluidized bed for an amount of time dependent upon the coating thickness desired. Very uniform, thin coatings may be achieved after processing.

Although the present disclosure has been described with reference to exemplary embodiments thereof, the present disclosure is not to be limited to such exemplary embodiments. Rather, it is contemplated that modifications, enhancements and/or variations to the disclosed fluidization systems and methods/processes may be made without departing from the spirit or scope of the present invention.

What is claimed is:

1. A method for fluidizing nanoparticles comprising the steps of:
   (a) providing a nanoparticle feedstock that includes (i) nanoparticles having an initial agglomerate size distribution, and (ii) a plurality of magnetic particles;
   (b) exposing said nanoparticle feedstock to a flow of fluidizing gas and a magnetic force, wherein exposure of said nanoparticle feedstock to said flow of fluidizing gas and said magnetic force is effective to modify said nanoparticles so as to define a second, reduced agglomerate size distribution; and
   (c) establishing an expanded fluidized bed such that said modified nanoparticles are in a substantially fluidized state and said plurality of magnetic particles are in a non-fluidized state, wherein the fluidized nanoparticles are in dynamic equilibrium and are characterized by an agglomerate size distribution that is substantially equivalent to said second, reduced agglomerate size distribution.

2. The method of claim 1, wherein said fluidizing gas is selected from the group consisting of: air, nitrogen, helium, argon, oxygen and mixtures thereof.

3. The method of claim 1, wherein said fluidized nanoparticles form highly porous agglomerates in a size range of about 50 microns to about 1000 microns.

4. The method of claim 1, further comprising a pre-screening step wherein nanoparticles in said nanoparticle feedstock are sieved to remove nanoparticle agglomerates that exceed a predetermined threshold size.

5. The method of claim 4, wherein said predetermined threshold size is about 500 μm.

6. The method of claim 1, wherein said magnetic force is sufficient to disrupt interparticle forces between nanoparticle agglomerates, thereby reducing the initial particle size distribution of said nanoparticles in said nanoparticle feedstock.

7. The method of claim 6, wherein said magnetic force is imparted by magnetic particles that are independent of said nanoparticles in said nanoparticle feedstock.

8. The method of claim 7, wherein said magnetic particles are energized by a force of at least 100 Gauss.

9. The method of claim 1, further comprising introducing a coating material such that said coating material coats said fluidized nanoparticles.

10. The method of claim 1, wherein said nanoparticle feedstock includes a first reactant, and further comprising introducing at least one additional reactant, such that a reaction occurs between said first reactant and said at least one additional reactant when said nanoparticles are in said substantially fluidized state.

11. The method of claim 1, wherein said exposure of said nanoparticle feedstock to said flow of fluidizing gas and said magnetic force or pre treatment is effective to achieve at least one of the following performance attributes: a reduction in bubble level within the fluidized system, a reduction in gas bypass relative to the fluidized bed, smooth fluidization behavior, a reduction in elutriation, a high level of bed expansion, a reduction in gas velocity levels to achieve a desired fluidization performance, enhanced control of agglomerate size or agglomerate distribution, and a combination of the foregoing performance attributes.

* * * * *